United States Patent
Flinn et al.

(10) Patent No.: US 9,436,913 B2
(45) Date of Patent: Sep. 6, 2016

(54) ADAPTIVE PROBABILISTIC COMPUTER-CONTROLLED METHOD AND SYSTEM

(71) Applicants: Steven Dennis Flinn, Sugar Land, TX (US); Naomi Felina Moneypenny, Houston, TX (US)

(72) Inventors: Steven Dennis Flinn, Sugar Land, TX (US); Naomi Felina Moneypenny, Houston, TX (US)

(73) Assignee: ManyWorlds, Inc., Brenham, TX (US)

( * ) Notice: Subject to any disclaimer, the term of this patent is extended or adjusted under 35 U.S.C. 154(b) by 0 days.

(21) Appl. No.: 14/840,567

(22) Filed: Aug. 31, 2015

(65) Prior Publication Data
US 2016/0004966 A1    Jan. 7, 2016

Related U.S. Application Data

(63) Continuation of application No. 13/027,042, filed on Feb. 14, 2011, now Pat. No. 9,159,027, which is a continuation of application No. 11/934,750, filed on Nov. 3, 2007, now abandoned, which is a continuation of application No. 11/329,722, filed on Jan. 10, 2006, now abandoned.

(51) Int. Cl.
| | |
|---|---|
| *G06N 5/00* | (2006.01) |
| *G06F 1/00* | (2006.01) |
| *G06N 5/02* | (2006.01) |
| *G06N 5/04* | (2006.01) |

(52) U.S. Cl.
CPC ............ *G06N 5/022* (2013.01); *G06N 5/04* (2013.01)

(58) Field of Classification Search
CPC .......... G06N 3/049; G06N 3/02; G06N 3/08; G06N 3/10; G06N 3/063
See application file for complete search history.

(56) References Cited

U.S. PATENT DOCUMENTS

| | | | | |
|---|---|---|---|---|
| 6,272,479 B1 * | 8/2001 | Farry | .................... | G06K 9/6217 700/213 |
| 2002/0083025 A1 * | 6/2002 | Robarts | ................... | G06F 1/163 706/12 |
| 2007/0094216 A1 * | 4/2007 | Mathias | ................... | G06N 5/04 706/52 |

* cited by examiner

*Primary Examiner* — Stanley K Hill
*Assistant Examiner* — Kalpana Bharadwaj

(57) ABSTRACT

An adaptive probabilistic computer-controlled method and system determines computer-controlled actions that are expected to reduce uncertainties that are embodied as probabilities and then updates the probabilities in accordance with the results of the computer-controlled actions. The updated probabilities inform the determination of subsequent computer-controlled actions. Expected values of information may also be applied in determining the subsequent computer-controlled actions. The computer-controlled actions may comprise analysis of content and generating recommendations that are delivered to users, and inferences from the analysis of content and usage behaviors may inform the updating of the probabilities. Statistical learning functions and/or neural networks may be applied in determining the computer-controlled actions.

21 Claims, 20 Drawing Sheets

Uncertainty Resolution Cost Framework

| expected future states | uncertain variables |
|---|---|
| expected future state 1 | uncertain variable 1 |
| expected future state 2 | uncertain variable 1 |
| expected future state 2 | uncertain variable 2 |
| expected future state 2 | uncertain variable 3 |
| expected future state 3 | uncertain variable 2 |
| expected future state 3 | uncertain variable 4 |
| expected future state 3 | uncertain variable 5 |
| expected future state 4 | uncertain variable 2 |

| uncertain variables | probabilistic models | data sets | UV-specific values of information |
|---|---|---|---|
| uncertain variable 1 | probabilistic model 1 | data set 1 | value of information 1 |
| uncertain variable 2 | probabilistic model 2 | data set 2 | value of information 2 |
| uncertain variable 3 | probabilistic model 3 | data set 3 | value of information 3 |
| uncertain variable 4 | probabilistic model 4 | data set 4 | value of information 4 |
| uncertain variable 5 | probabilistic model 5 | data set 5 | value of information 5 |

ADAPTIVE PROBABILISTIC COMPUTER-CONTROLLED METHOD AND SYSTEM

CROSS-REFERENCE TO RELATED APPLICATIONS

The present application is a continuation of U.S. patent application Ser. No. 13/027,042, which is a continuation of U.S. patent application Ser. No. 11/934,750, which is a continuation of U.S. patent application Ser. No. 11/329,722, filed on Jan. 10, 2006.

FIELD OF INVENTION

This invention relates to decision processes and, more particularly, to processes and associated methods and computer-based programs in which probabilistic inferencing and experimental design are applied to support decision processes.

BACKGROUND OF THE INVENTION

Many decisions are influenced by some element of uncertainty. It is often valuable to take actions to gather information that may, at least in part, resolve uncertainties associated with a decision. Some calculation methods associated with determining the value of perfect or imperfect information are known from prior art. For example, the application of decision tree techniques may enable the derivation of expected values of information associated with an information gathering action. These methods typically require significant manual modeling efforts.

Experimental design or "design of experiment" methods are also known from prior art. These are methods of organizing experiments, or more broadly, any type of information gathering actions, in a manner so as to maximize the expected value of the resulting information, typically in accordance with constraints, such as an action budgetary constraint. For example, factorial matrix methods are a well established approach to scientific experimental design. These types of design of experiment methods typically require a statistician or other human expert to manually establish the experimental design parameters, and the proper sequencing of the experiments.

Making inferences from information attained as a result of experiments or, more broadly, information gathering actions, is well known from prior art. For example, in the prior art, a wide variety or statistical techniques are known and may be applied. These statistical techniques generally require some degree of interpretation by a statistician or other expert to be applied to decisions. And, in the prior art, a limited ability to automatically conduct experimental or information gather actions is known, but the application is invariably constrained by the requirement of human intervention to interpret interim results and adjust the experimentation accordingly.

Thus, in the prior art, each of the steps of determining expected value of information, of experimental design, of conducting experimentation, and of performing statistical or probabilistic inferencing from new information generated by experimentation, requires significant human intervention. Furthermore, in prior art processes, there does not exist an automatic feedback loop from the inferencing from new information step to the value of information and experimental design steps. This introduces significant bottlenecks in addressing and resolving uncertainties associated with decisions efficiently and effectively. This deficiency of the prior art processes and systems represents a particularly significant economic penalty in situations in which large amounts of relevant information is already available, or can be gathered rapidly. For example, high throughput experimentation methods can enable rapid acquisition of new information. However, manual bottlenecks may effectively limit the actually attainable throughput of such experimental infrastructure, and, more generally, limit the most effective use of available historical information.

The economic penalties associated with prior art decision processes are particularly acute in business processes such as product and/or service research and development, for which the manual interventions required in decision processes diminish both the efficiency and the effectiveness (measured in both quality and timeliness) of the decision making.

Hence, there is a need for an improved process, method, and system to resolve uncertainties associated with decisions.

SUMMARY OF INVENTION

In accordance with the embodiments described herein, a method and system for an adaptive decision process is disclosed. The adaptive decision process, as the process is known herein, addresses the shortcomings of the prior art by enabling an automatic closed loop approach to information gathering decisions and the evaluation of the results of the information gathering.

Other features and embodiments will become apparent from the following description, from the drawings, and from the claims.

BRIEF DESCRIPTION OF THE DRAWINGS

FIG. 8 is a diagram of an uncertainty mapping applied by the adaptive decision process of FIG. 2, according to some embodiments;

FIG. 9 is a diagram of a value of information mapping applied by the adaptive decision process of FIG. 2, according to some embodiments;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with the embodiments described herein, a method for an adaptive decision process, and a system enabling the adaptive decision process, are disclosed. In some embodiments, the adaptive decision process utilizes the methods and systems of generative investment processes as disclosed in PCT Patent Application No. PCT/US2005/001348, entitled "Generative Investment Process," filed on Jan. 18, 2005, and may apply the methods and systems disclosed in PCT Patent Application No. PCT/US2005/011951, entitled "Adaptive Recombinant Processes," filed on Apr. 8, 2005, which are both hereby incorporated by reference as if set forth in their entirety.

Figure 1:
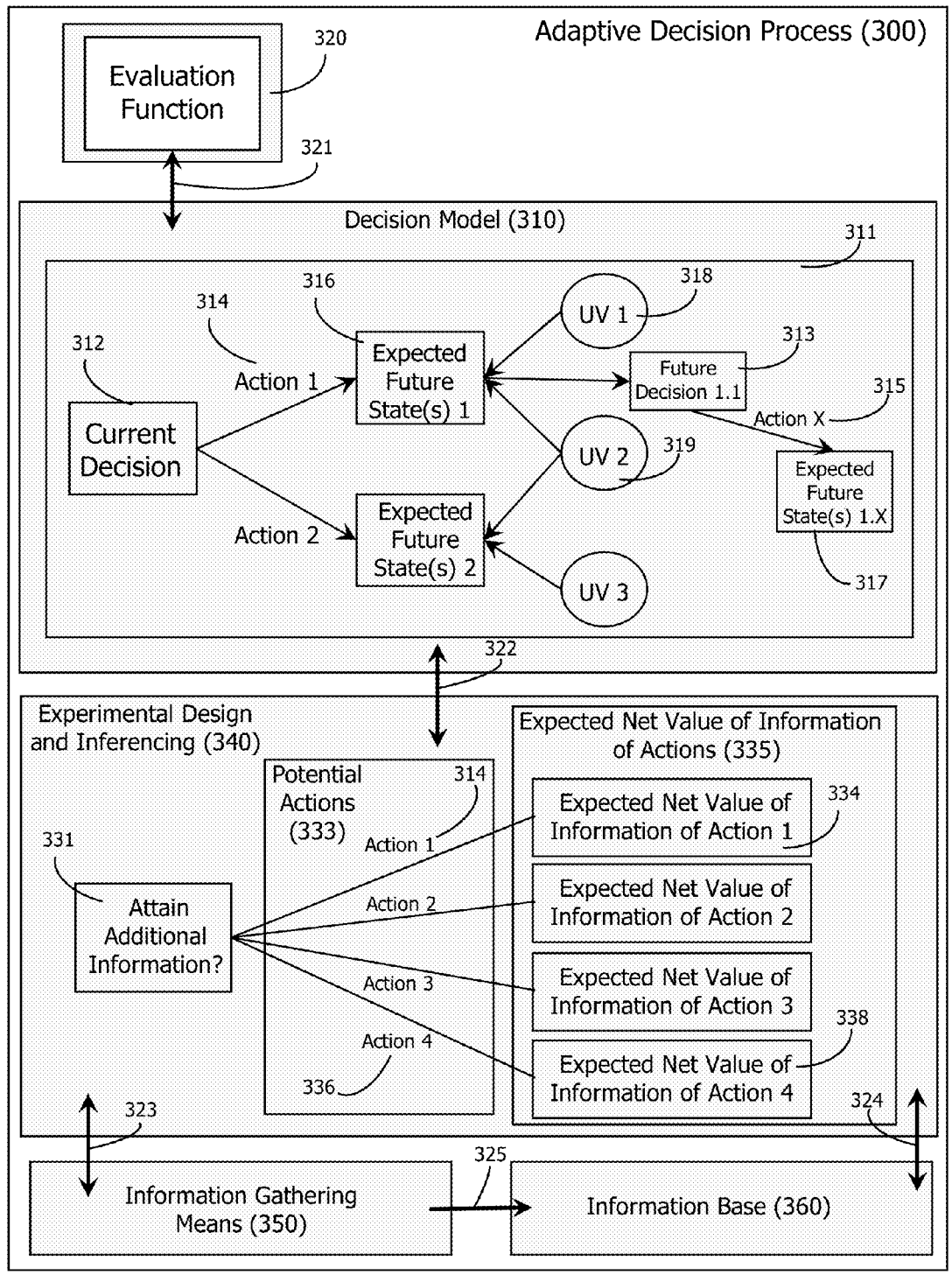
FIG. 1 is a block diagram illustrating an adaptive decision process, according to some embodiments.

FIG. 1 summarizes an exemplary architecture 300 of one embodiment of the adaptive decision process. A decision is established and modeled 310. The decision may be represented in a decision tree form 311, although other models for representing the decision may be applied. The decision tree model 311 may be derived from other decision modeling techniques, such as influence and/or relevance models or diagrams. The decision model 311 is comprised of a current decision 312, one or more potential actions 314 that must be decided upon, and one or more expected future states 316 that are the expected consequences of performing the one or more actions 314. The future states are influenced by one or more uncertain variables (UV) 318. The uncertain variables 318 may be modeled mathematically as discrete or continuous probability functions, and the associated future states 316 may be discrete, or they may be represented mathematically as a continuous function or functions. Continuous functions may be discretized as required to make the decision model 311 more manageable. Note that an uncertain variable 319 may influence more than one expected future states 316.

Second order future decisions 313 may be identified, conditional on the first order expected future states 316, and these second order future decisions 313 may be associated with second order future actions 315 that may lead to a next order or level of future states 317. Additional levels of decisions, associated actions, future states, and associated uncertain variables may be "chained together" without limit.

An evaluation function 320 may be applied 321 to support the determination of one or more appropriate actions 314. The evaluations of the one or more potential actions 314 that comprise a current decision 312 by the evaluation function 320 may be based on decision criteria that include expected financial benefits, net of expected costs. These financial metrics may include discounting cash flows, thereby yielding a net present value. Alternatively, option-based valuations may be used. Other financial metrics such as internal rate of return or payback time may be used, although these metrics may require additional adjustments to achieve proper results. The net benefits may be adjusted by expectations or probabilities of success, to yield an expected net benefit associated with a decision 312 and its corresponding potential actions 316. ("Investment Science," Luenberger, 1998, provides a survey of the current art with regard to investment modeling.)

The evaluation function 320 may apply adjustments to the calculated value of an action based on factors such as risk (i.e., variance in expected outcomes), including application of utility functions that incorporate risk. In some embodiments, the evaluation function applies a metric to each "leaf" node of the decision tree framework 311, and then calculates backward to the current decision 312 to determine the expected values of each possible action path within the decision tree model 311. The action 314 with the largest expected value may then be chosen to be executed. The examples of financial and non-financial criteria applied by the evaluation function 320 described herein are merely illustrative and not exhaustive. The evaluation function 320 may apply one or more of the financial and non-financial criteria.

The decision model 310 can be considered to address and/or represent the direct, proximal, or "primary" decision 312. However, there also exists an indirect or "meta-decision": the decision as to whether to attain additional information that would be expected to resolve, to at least some degree, uncertainties corresponding to uncertain variables 318 that are associated with the primary decision 312, prior to making the primary decision 312. The experimental design and inferencing function 340 addresses this meta-decision 331, and the associated one or more potential actions 333 expected to result in attainment of additional information that reduce uncertainties associated with the one or more uncertain variables 318. The actions 333 may be comprised of both actions 314 associated with the primary decision 312, which may be expected to produce uncertainty resolution information as a "by-product" of execution of the action 314, as well as actions 336 that are totally or primarily for the purpose of generating information that is expected to assist in resolving uncertainties associated with uncertain variables 318. The expected net values 335 of each potential action of the set of all potential actions 333 may be determined by the experimental design and inferencing function 340. For actions that may be considered independent, the action from the set of all potential actions 333 with the highest positive expected net value may be selected for execution. Depending on timing factors and correlations among actions 333, more than one action may be selected for execution. If none of the actions 333, individually of collectively, has an expected net value greater than zero, then no explicit actions regarding attainment of additional information should be conducted.

The expected net values 335 of one or more actions 333 may include the expected value of the information that will result from action 333 based on the expected degree of resolution of uncertainty associated with the one or more uncertain variables 318, as well as the cost of conducting the action 333. In some embodiments, a value adjustment associated with the expected amount of time to attainment of the information resulting from the action 333 may be applied.

As indicated above, in some embodiments, the actions 333 associated with attaining additional information may include actions 314 associated with the primary decision 312. The expected net value of information 335 associated with these actions 314 may thus be calculated directly within the experimental design and inferencing function 340. In other embodiments, this value 334 is determined directly by the evaluation function 320 as it is applied to the decision model 310.

The experimental design and inferencing function 340 interacts with 322 the decision model 310. The interactions 322 may be directly within a single computer-based software model, or across multiple computer-based software models or model components, potentially residing on different computer-based systems.

The experimental design and inferencing function 340 may interact 323 with an information gathering means 350 and/or an interact 324 with an information base 360. The information gathering means 350 may include any automatic or non-automatic methods or systems for executing actions 333 to attain additional information. These methods and/or systems may include, but are not limited to, computer-based search functions, computer-based data analysis functions, data mining functions, information retrieval systems, computer-based intelligent agents, human expert networks, surveys, and process control systems to operate experimental or information gathering infrastructure, including instrumentation, sensors, robotics, and other apparatus than may be used to gather information relevant to the decision model 310. The information gathering means 350 and/or its constituent parts may also be termed "information gathering infrastructure", "experimental infrastructure", or just "infrastructure" herein. The information base 360 may contain information that has been attained through application of the information gathering means 350, or from other means or sources. The information may be in digital form, and may be stored in data structures that are organized as hierarchies, networks, or relational table structures. Although information gathering means 350 and information base 360 are depicted as external to experimental design and inferencing function 340 in FIG. 1, either may be internal to experimental design and inferencing function 340 in some embodiments. In other embodiments, information gathering means 350 and information base 360 may be external to the adaptive decision process 300, rather than internal as depicted in FIG. 1. In any of these organizing topologies, information gathering means 350 may be able to directly transfer information 325 to the information base 360, and the transfer of information 325 may be through any type of communications link or network. Likewise, the transfer of information 323 between the experimental design and inferencing 340 and the information gathering means 350, and the transfer of information 324 between the experimental design and inferencing 340 and the information base 360, may be within a single computer, or across a computer network, such as the Internet.

Figure 2:
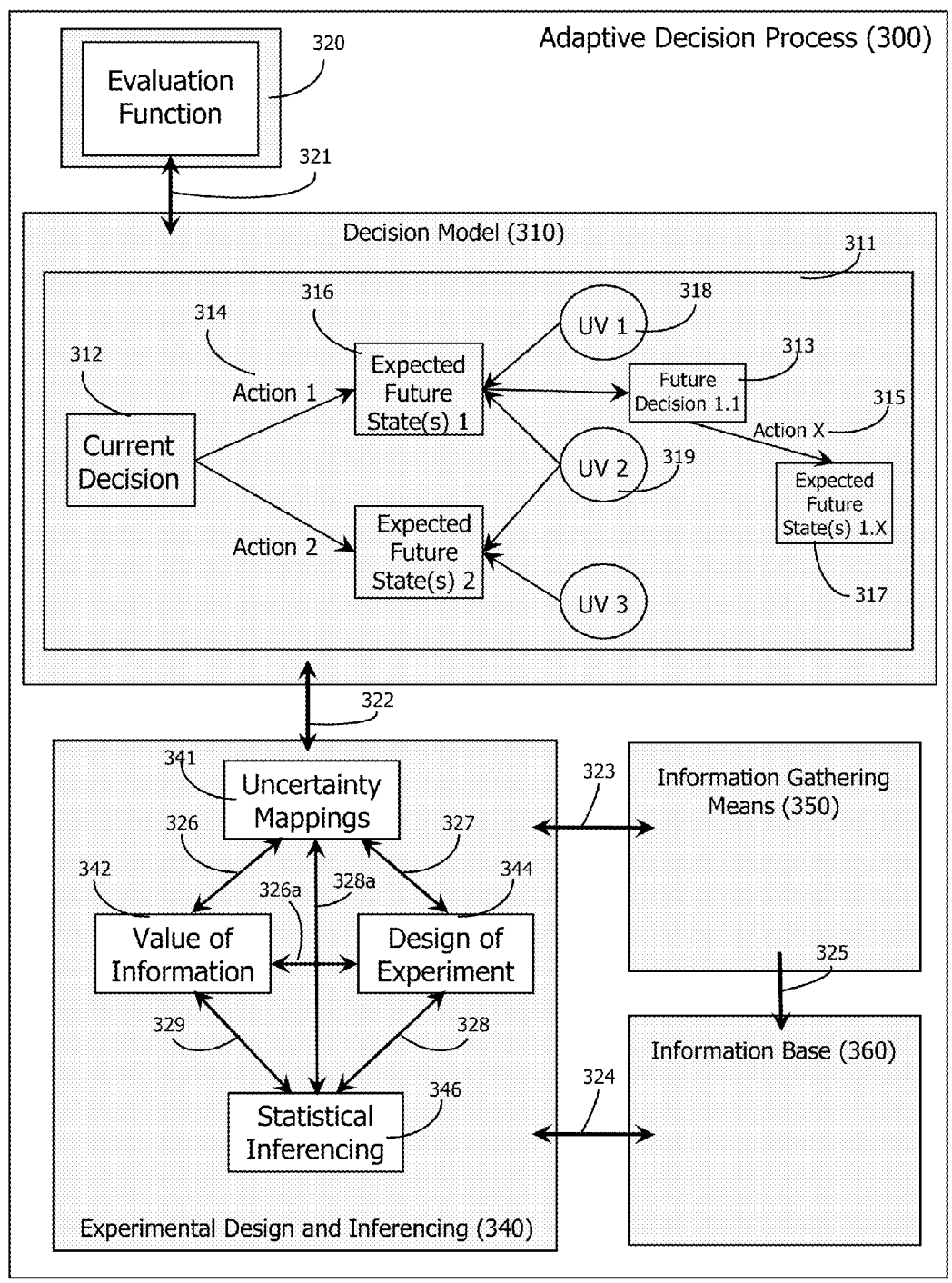
FIG. 2 is a block diagram showing further details of an adaptive decision process according to some embodiments.

FIG. 2 depicts more details of the functions associated with the experimental design and inferencing function 340, in accordance with a preferred embodiment. The experimental design and inferencing function 340 may include one or more of: an uncertainty mapping function 341, a value of information function 342, a design of experiment function 344, and a statistical inferencing or learning function 346.

The uncertainty mapping function 341 includes a mapping of uncertainties corresponding to uncertain variables 318 of the decision model 310 with actions 333 and other decision-related variables and information. The quantification of the uncertainties may be based on subjective assessments, or may be derived from statistical or probabilistic modeling techniques applied to sets of data.

The value of information function 342 enables the generation of absolute and/or relative values of perfect or imperfect information associated with resolving uncertainties associated with uncertain variables 318 of the decision model 310, as defined by the uncertainty mappings 341A (see FIG. 8), and based, at least in part, on input 326 from the uncertainty mappings function 341.

Based, at least in part, on value of information inputs 326a from the value of information function 342 and optionally on uncertainty mapping inputs 327 of the uncertainty mappings function 341, a design of experiment or experiments, (also termed an "experimental design" herein), or more broadly, an experimental plan, for achieving additional information may be generated by the design of experiment function 344. It should be understood that the term "experiment," as used herein, does not necessarily only imply scientific information gathering. Rather, "experiment", as used herein, should be understood to encompass any action to attain information intended to resolve uncertainties, regardless of the domain or field of application.

In addition to the value of the information itself, the expected cost of conducting experiments or gathering information may be incorporated by the design of experiment function 344 in determining an effective information gathering plan. Dependencies or correlations among the uncertainties associated with the uncertain variables 318 of the decision model 310 are incorporated to generate a suggested possible sequencing of experiments or information gathering actions 336. The generation of the sequence of experiments 336 may be enabled by an optimization algorithm. The optimization algorithm may utilize a Bayesian network model and/or a dynamic programming model, a statistical learning model, or one or more other models or algorithms that enable optimization of stochastic processes.

Figure 16:
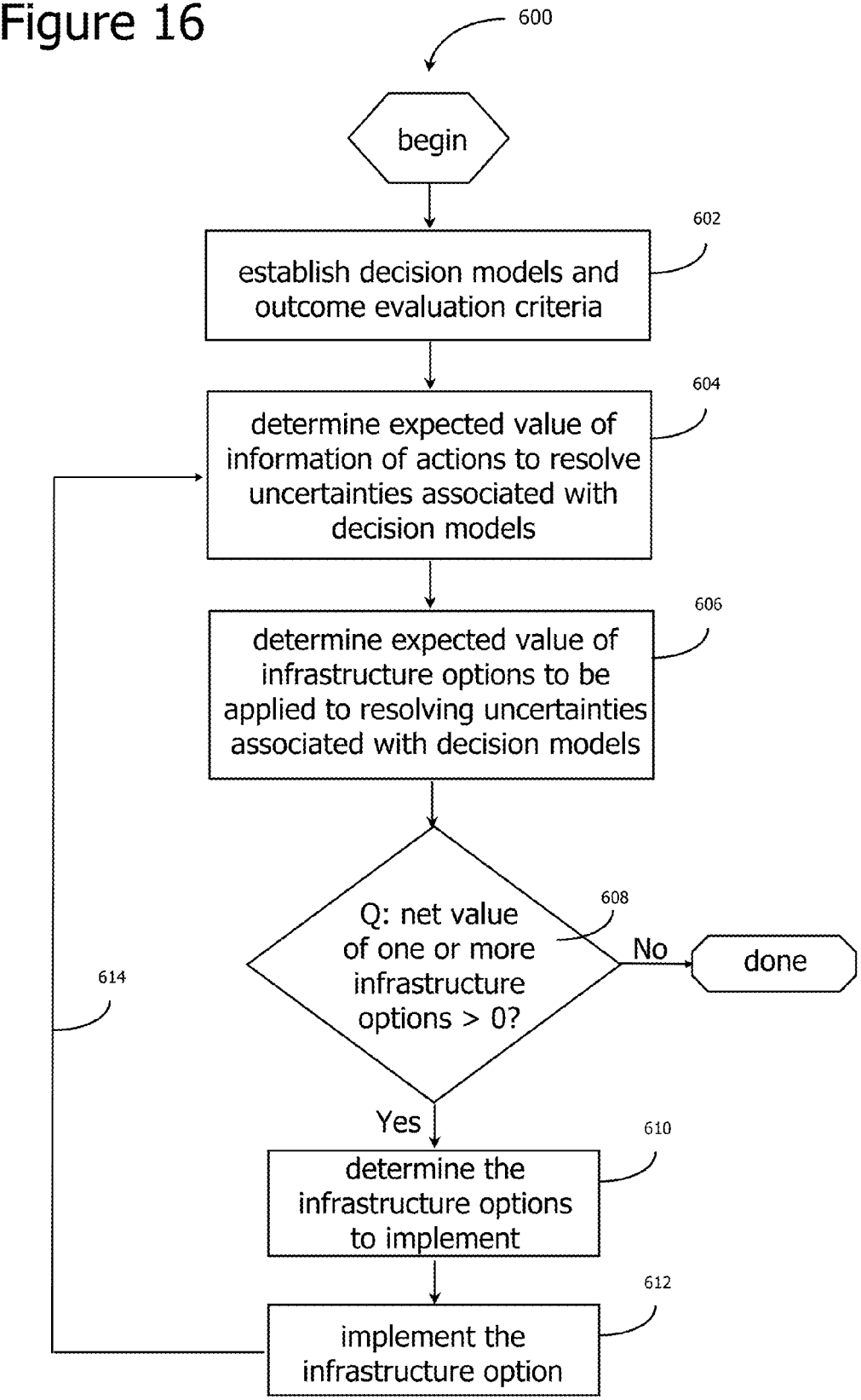
FIG. 16 is a flow diagram of an experimental infrastructure decision process, according to some embodiments.

Further, in addition to the adaptive decision process 300 applying the value of information function 342 to determining the value associated with a specific decision associated with a decision model 310, the value of information function 342 may be applied to longer-term decisions regarding the means of information gathering or experimental infrastructure 350 required on an ongoing basis. If attaining additional information decisions 331 are considered "meta-decisions" associated with direct decisions 312, then decisions on the development and maintenance of the infrastructure 350 to perform the meta-decisions 331 may be considered "meta-meta-decisions." The value of information for multiple expected future direct decisions 312 and corresponding information gathering decisions 331 may be aggregated to determine the value of various test infrastructure alternatives. Subtracting the expected fixed costs of the infrastructure, as well as the expected variable costs (i.e., per unit costs), from the expected value of information gains from the expected use of the infrastructure 350 provides evaluation criteria that can be applied to support decisions on infrastructure alternatives. This information gathering infrastructure 350 may include, for example, high throughput experimentation infrastructure for materials science or life sciences applications, digitized knowledge bases of content or data, and stationary or mobile sensing instrumentation. FIG. 16 and the accompanying description describe the process for deciding on changes or enhancements to the experimental infrastructure 350 in more detail.

The results of experiments conducted by the experimental infrastructure 350 may be delivered to 323, and then evaluated or analyzed, by the statistical inferencing function 346. The degree of resolution of uncertainties may be delivered to 328a the uncertainty mapping function 341, be assigned to the corresponding elements of the uncertainty mapping 341a, and may be fed back 329 to the value of information function 342 and/or fed back 328 to the design of experiment function 344. In FIG. 2, the functions 341, 342, 344, and 346 are shown interrelating with one another; these functions are described generally as experimental design and inferencing 340, as performed by the adaptive decision process 300.

Figure 3:
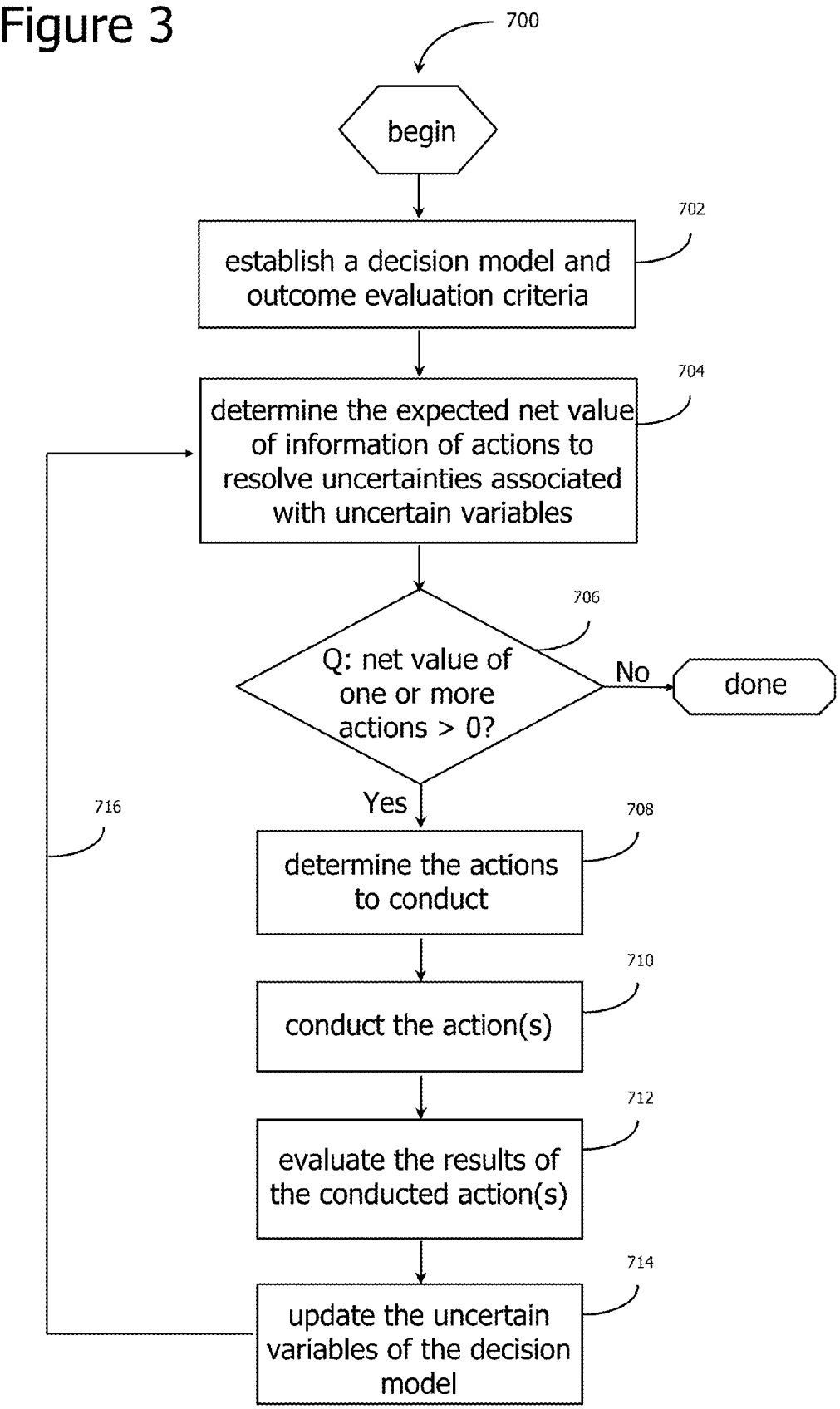
FIG. 3 is a flow diagram of the adaptive decision process of FIG. 2, according to some embodiments.

In accordance with some embodiments, FIG. 3 depicts the overall process flow 700 performed by the adaptive decision process 300. In the first step of the process, a decision model and associated outcome evaluation criteria are established 702, corresponding to decision model 310 and evaluation function 320 of FIG. 2.

Corresponding to, and/or applying, the value of information function 342 of the experimental design and inferencing function 340 of FIG. 2, the expected net value of actions specifically associated with providing information to resolve uncertainties of uncertain variables 318 of the decision model 310 is then determined 704. A determination 706 of whether the expected net value 338 of at least one of these actions 336 is positive is then conducted. If none of the expected net values 338 of the information gathering-specific actions 336, individually or collectively, is positive, then no information gathering-specific actions 336 are conducted. Or, if expected net values 338 of the information gathering-specific actions 336 that have a higher value than the expected net values 334 of the potential primary decision actions 314 do not exist, then only actions 314 associated with the primary decision 312 are considered further. (To the extent actions 314 associated with the primary decision 312 are expected to generate at least some information relevant to reducing uncertainty with regard to uncertain variables 318, then some or all of the methods and systems of the experimental design and inferencing function 340 may still be applied.)

If at least one of the expected net values 338 of the information gathering actions 336, individually or collectively, is positive, then the actions to conduct are determined 708. Step 708 corresponds to, and/or may apply, the design of experiment function 344 of the experimental design and inferencing function 340 of FIG. 2. Information gathering actions 336 that are positive in value are individually prioritized. Sets of actions 336 may also be evaluated and prioritized. Based on the individual or collective prioritizations, one or more actions 336 may be selected 708 to be conducted. If more than one action is determined 708 to be conducted, a suggested sequencing of the actions that maximizes the net value of the set of actions may be generated.

The actions 336 are then conducted 710. The actions may be conducted 710 through application of the information gathering means 350. Results of the actions 336 are then evaluated 712. The evaluation may occur as the action(s) 336 is conducted, through interpretation of preliminary results, or may be performed after the action 336 is completed. The evaluation of the information resulting from the actions may be conducted by applying statistical algorithms or models of the statistical inferencing function 346 of the experimental design and inferencing function 340.

Based on the evaluation of the results of the action(s) 336, the corresponding uncertain variables 318 of the decision model 310 are updated 714 through application of the uncertainty mappings function 341 of the experimental design and inferencing function 340. The updating of the uncertain variables may be performed through the updating of the probability density or distribution functions associated with the uncertain variables 318. This updating step 714 then enables 716 a new set of expected net value of actions to be determined 704 based on the updated uncertain variables. Thus, a feedback loop 716 is established, and the process continues until there are no longer information attaining actions 336, individually or collectively, that have positive net value.

In some embodiments, some or all of steps of the adaptive decision process as shown in FIG. 3 are automated through computer-based applications. Steps 702, 704, 706, 708, 712, 714, and 716 may all be embodied in computer-based software programs, and each step may operate on a fully automatic basis, or on a semi-automatic basis. (The term "automatic", as used herein, is defined to mean without direct human interventions, that is, under computer-based software control. The terms "semi-automatic" or "semi-automatically," as used herein, are defined to mean that the described activity is conducted through a combination of one or more automatic computer-based operations and one or more direct human interventions.) The process step of conducting the actions 710 may be fully automated when the actions address information that is embodied in computer applications, such as in automatically searching and/or accessing and/or analyzing digitally encoded information. Analyzing digitally encoded information may include applying data mining systems. Conducting the actions 710 may also be fully automated when the actions constitute applying automated testing infrastructure, such as, for example, high throughput experimentation methods or other types of automated or semi-automated instrumentation or apparatus. Such approaches may include the application of process and systems that include combinations of software, hardware and/or apparatus components, such as robotic-based experimentation methods, sensors, apparatus under direction of process control systems, and/or other types of automated instrumentation.

Figure 4:
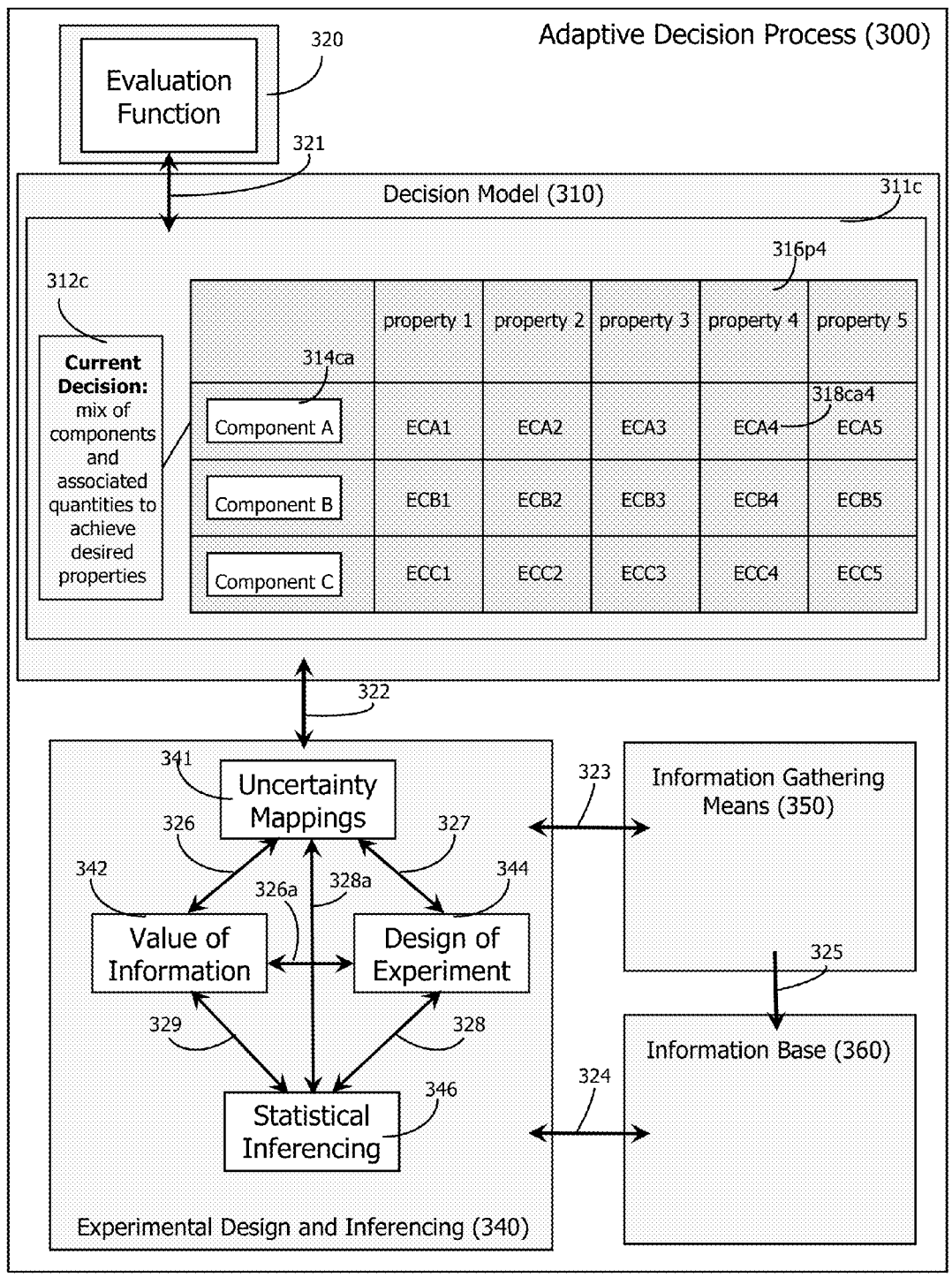
FIG. 4 is a block diagram of the adaptive decision process of FIG. 2, with an alternative representation of a decision model, according to some embodiments.

FIG. 4 illustrates that the decision model 310 may be represented in other than decision tree-type formats in some embodiments. These alternative representations may include elements that map to a decision tree format, however. For example, the decision 312c of decision model 310 in FIG. 4 relates to finding the best mix and quantities of components that constitute a product or service that meet criteria associated with one or more properties. The term "component" as used herein, may include tangible or intangible elements, including, but not limited to, molecules, formulations, materials, technologies, services, skills, relationships, brands, mindshare, methods, processes, financial capital and assets, intellectual capital, intellectual property, physical assets, compositions of matter, life forms, physical locations, and individual or collections of people.

Thus, decision model 310 in FIG. 4 is comprised of a table or matrix-oriented structure 311c. The one or more components, and associated quantities, as represented by "Component A" 314ca, have an effect, represented by component effect instance "ECA4" 318ca4, on one or more properties, represented by property instance "Property 4" 316p4. In this case, the quantity of a component instance 314ca (where the quantity may be zero), can be considered an action 314 as depicted in the decision tree format 311. The property instance 316p4 may be considered an expected future state 316 as depicted in the decision tree format 311. And the effect 318ca4 of the component instance 314ca on the property instance 316p4 may be considered an uncertain variable 318 as depicted in the decision tree format 311.

The tabular or matrix decision model representation 311c of the adaptive decision process may be particularly applicable to formulation or composition-based product development in areas, such as, but not limited to, pharmaceuticals, chemicals, personal care products, and foodstuffs and beverages. The decision model representation 311c of FIG. 4 may also apply advantageously to other materials-based products applications such as electronics, building materials, and the life sciences in general. The decision model representation 311c may also effectively apply in developing digitally based products such as software and media-based products such as texts, videos, songs, and any other digitally represented product that may be "tested" by manual or automated means.

Value of Actions

In accordance with some embodiments of the value of information function 342 of the experimental design and inferencing function 340, the expected net value of an action can be defined as a function of the expected direct value (non-informational value) of the action, the value of information generated by the action, and the expected cost of taking the action. The value relationship can be written in equation form as follows:

Expected Value of Action $X$=Expected Direct Value of Action $X$+Expected Informational Value of Action $X$−Expected Cost of Action $X$ Actions 336 whose value is wholly or primarily expected to derive from informational value traditionally are generally referred to by specific, special nomenclature, such as "experiments", "information gathering", and "business intelligence." Examples of specific actions 336 primarily aimed at resolving uncertainty include financial and other business modeling, business and competitor intelligence, customer and market intelligence and feedback, computer-based system user feedback, funding source analysis, feasibility studies, intellectual property analysis and evaluations, product (where product may include or be a service or solution) development testing and experimentation, prototyping and simulations. Product testing may include in vitro and in vivo testing, in silico modeling approaches, including molecular modeling, combinatorial chemistry, classic bench scale testing, high throughput experimentation or screening methods, clinical trials, and field tests. ("Experimentation Matters," Thomke, 2003, provides a relevant overview of current art regarding experimentation.) Other types of actions 314 may have other, primarily non-informational generated aims, but may be expected to provide relevant information as a by-product. Deciding 312 to defer an action to a definite or indefinite future time may also logically be defined as an explicit action 314, thereby promoting completeness and consistency in considering action alternatives in adaptive decision process 300.

Figure 5:
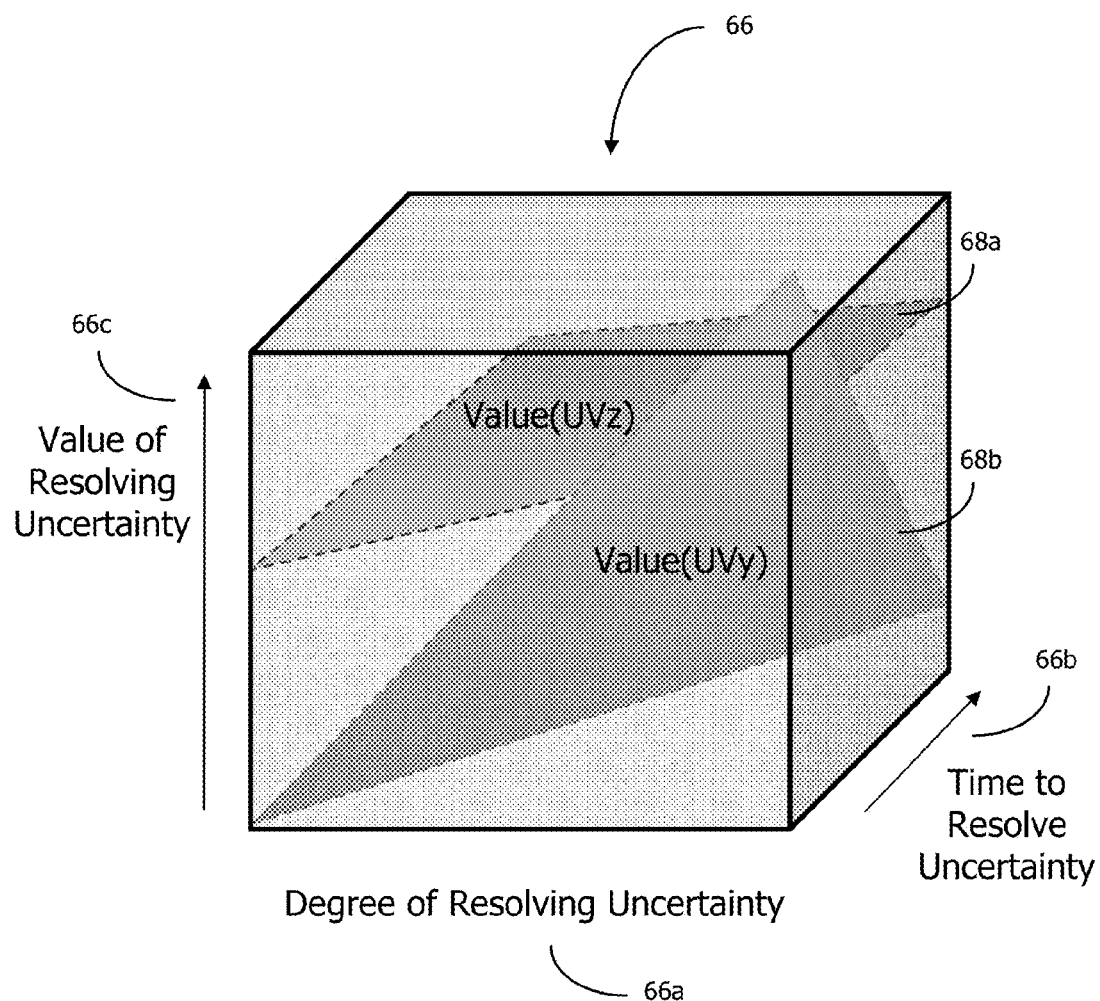
FIG. 5 is a diagram of an uncertainty resolution value framework, according to some embodiments.

According to some embodiments, FIG. 5 depicts a framework 66 associated with generating the expected value of potential actions 333 that can be expected to reduce uncertainties associated with a decision 312. The action value framework 66 may be applied by the value of information function 342 of the adaptive decision process 300. The framework 66 includes three dimensions. The first dimension 66a is the degree to which an action is expected to resolve uncertainty associated with an uncertain variable 318. This value can range from no expected resolution of the associated uncertainty, to an expectation of complete resolution of the associated uncertainty given the action is taken. The second dimension 66b is the expected time required from initiation of the action to the time of the availability of the information or the interpretation of the information generated by the action. The third dimension 66c is the value of the information associated with the action, given specific values associated with the other two dimensions.

Mappings 68a and 68b within the framework 66 are examples of representations of the magnitude of the value of information associated with resolving uncertainties 66c of an uncertain variable 318 as a function of the expected degree of resolution of the uncertainties 66a, and the expected time to resolve the uncertainties 66b. The mapping thus reflects the value of the expected results of potential actions 333 resulting in new information having a bearing on the uncertain variable. Each mapping may be described as a value function associated with an uncertain variable (UV) 318, which may be more generally described as Value (UVn), for any uncertain variable UVn, where there exist n uncertain variables 318 in decision model 310, and n is an integer.

For example, mapping 68a represents the information value across the range of degrees of resolution of uncertainty 66a, and across the range of the durations required to achieve the resolution of uncertainty 66b, associated with the uncertain variable UVz. Mapping 68b represents the information value across the range of degrees of resolution of uncertainty 66a, and the across the ranges of the duration required to achieve the resolution of uncertainty 66b, associated with another uncertain variable UVy. Although the example mappings 68a and 68b are shown as linear, it should be understood that in general the value of information mappings may be non-linear or discontinuous.

The value of information (perfect or imperfect) mapping may be derived by the value of information function 342 through decision tree modeling techniques associated with decision model 310, and the application of the evaluation function 320. Alternatively, the value of information may be calculated through the application of other mathematical modeling techniques, including Bayesian approaches, Monte Carlo simulations, or dynamic programming modeling incorporating stochastic variables. The value of information may also be affected by other variables associated with the decision makers, such as risk profiles and other utility functions. (The Stanford University manuscript, "The Foundations of Decision Analysis," Ronald A. Howard, 1998, provides a relevant review of value of information calculation methods.)

Decisions to defer actions for a certain amount of time may be considered explicit actions 333. The time dimension 66b in the framework 66 takes into account the timing aspect of the value of information function. Further, the degree of resolving uncertainty dimension 66a may not necessarily have a value of zero when deferring an action—additional relevant information may be expected to reveal itself even when no active action is conducted. In other words, such a positive expected value of information represents the value of waiting associated with a specific action.

Figure 6A:
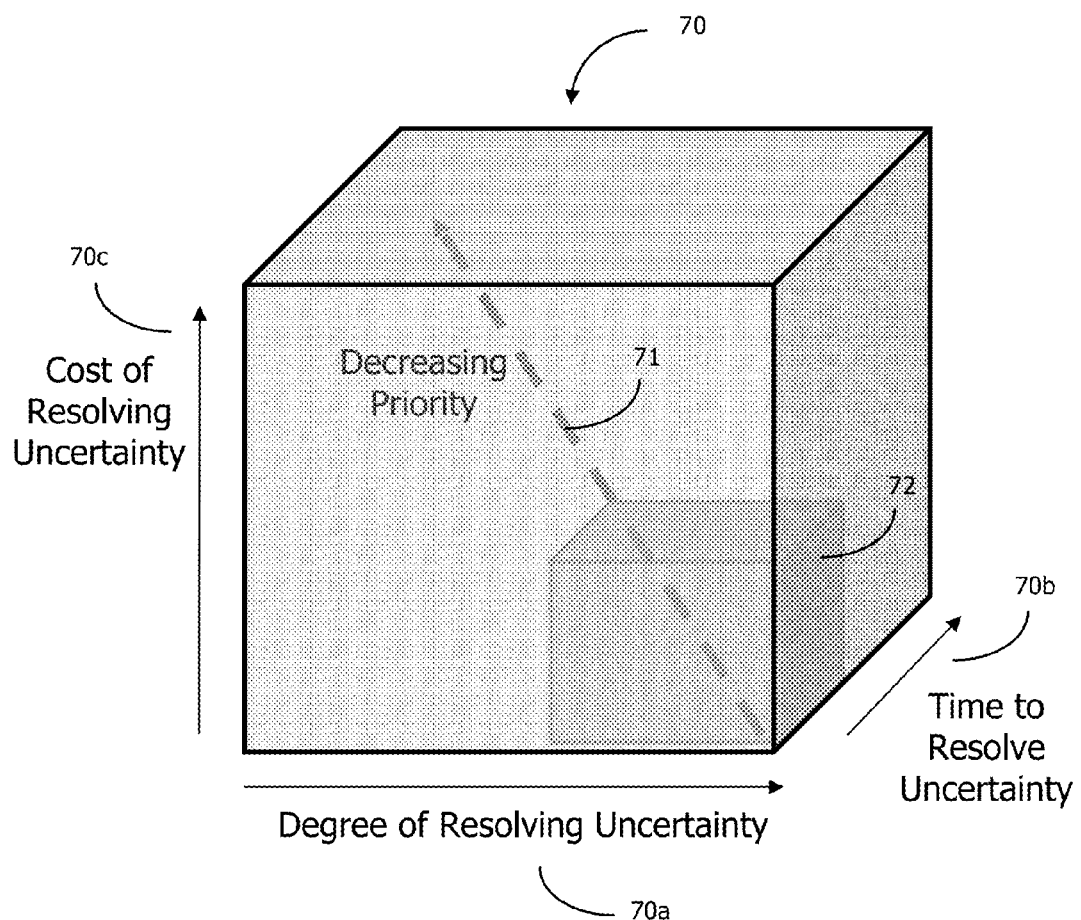
FIG. 6A is a diagram of an uncertainty resolution cost framework, according to some embodiments.

FIG. 6A depicts a framework 70 for evaluating the cost of actions 336 to resolve uncertainty that may be applied by the value of information function 342 of the adaptive decision process 300, in some embodiments. The uncertainty resolution cost framework 70 features three dimensions. The first dimension 70a is the degree to which the action is expected to resolve uncertainty. The second dimension 70b is the expected time it will take to perform the action and interpret the results of the action to resolve the uncertainty. The third dimension 70c is the expected cost of conducting the associated action to resolve the uncertainty, as a function of the other two dimensions of the framework 70. Ignoring the impact of the absolute or relative value of the resulting information, it may be desirable to take actions, to the extent they exist, that are expected to be low-cost, timely, and able to significantly resolve uncertainties, as exemplified by the region 72 within the framework 70. The general prioritization of actions on this basis is illustrated by the "decreasing priority" line 71 within the framework 70.

Figure 6B:
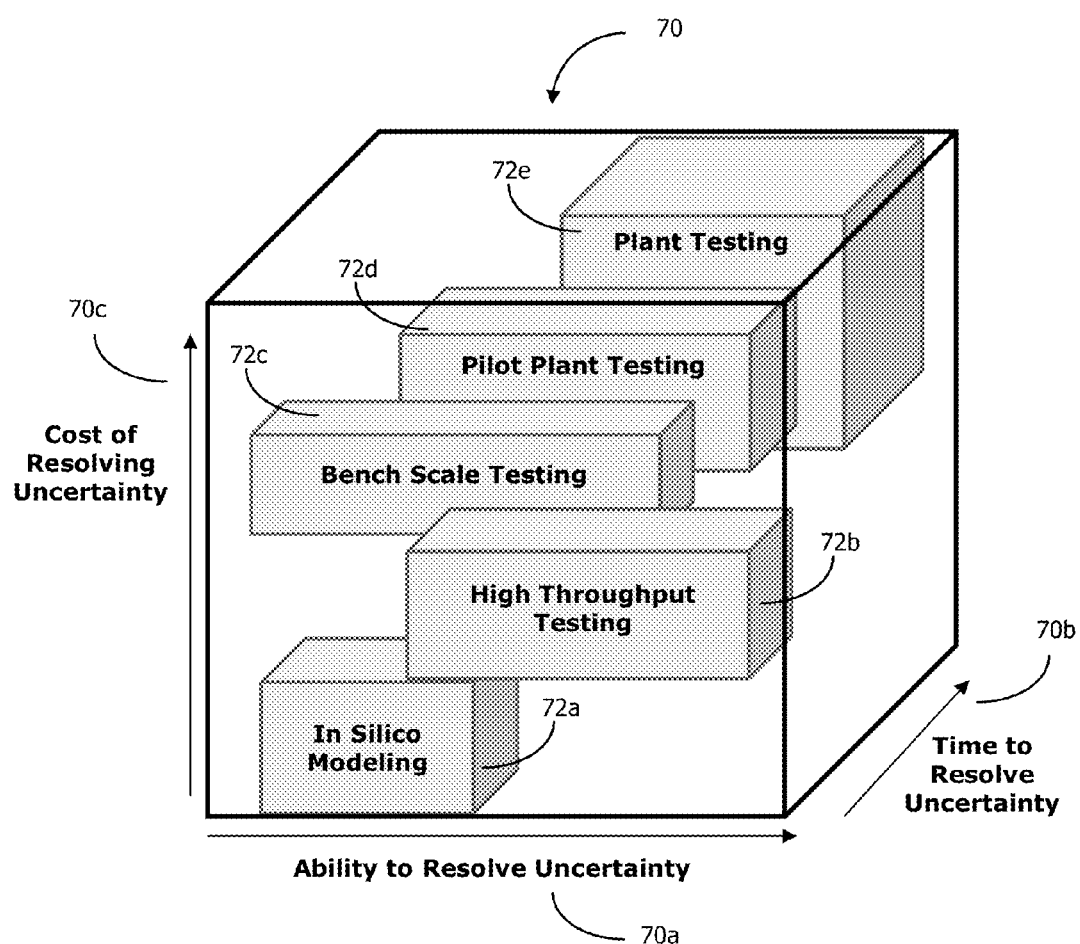
FIG. 6B is a diagram of specific information sources within the uncertainty resolution cost framework of FIG. 6A, according to some embodiments.

FIG. 6B illustrates specific types or classes of information gathering means 350 within the context of framework 70. The information gathering means 350 types depicted in FIG. 6B may be particularly applicable to composition of matter-based product development decisions in fields such as pharmaceuticals and chemicals. Other fields may include different types of information gathering means 350.

The example types of information gathering means 350 within framework 70 of FIG. 6B includes in silico modeling 72a, high throughput testing 72b, bench scale testing 72c, pilot plant testing 72d, and plant testing 72e. The arrangement of information gathering means 350 examples is consistent with each example's positioning versus the three dimensions 70a, 70b, 70c of the uncertainty resolution cost framework 70. For example, in silico modeling 72a, which may include any type of computer software-based modeling or simulation, is typically less expensive and faster to conduct than actual physical testing, also typically provides less ability to resolve uncertainty 70a than physical testing. At the other extreme, actual testing of products that have been produced by commercial plants 72e typically provides the greatest resolution of uncertainty 70a, but is also typically more expensive and slower to conduct than in silico modeling 72a, or other smaller scale physical testing means such as high throughput testing 72b, bench-scale testing 72c, or pilot plant-scale testing 72d.

Figure 7:
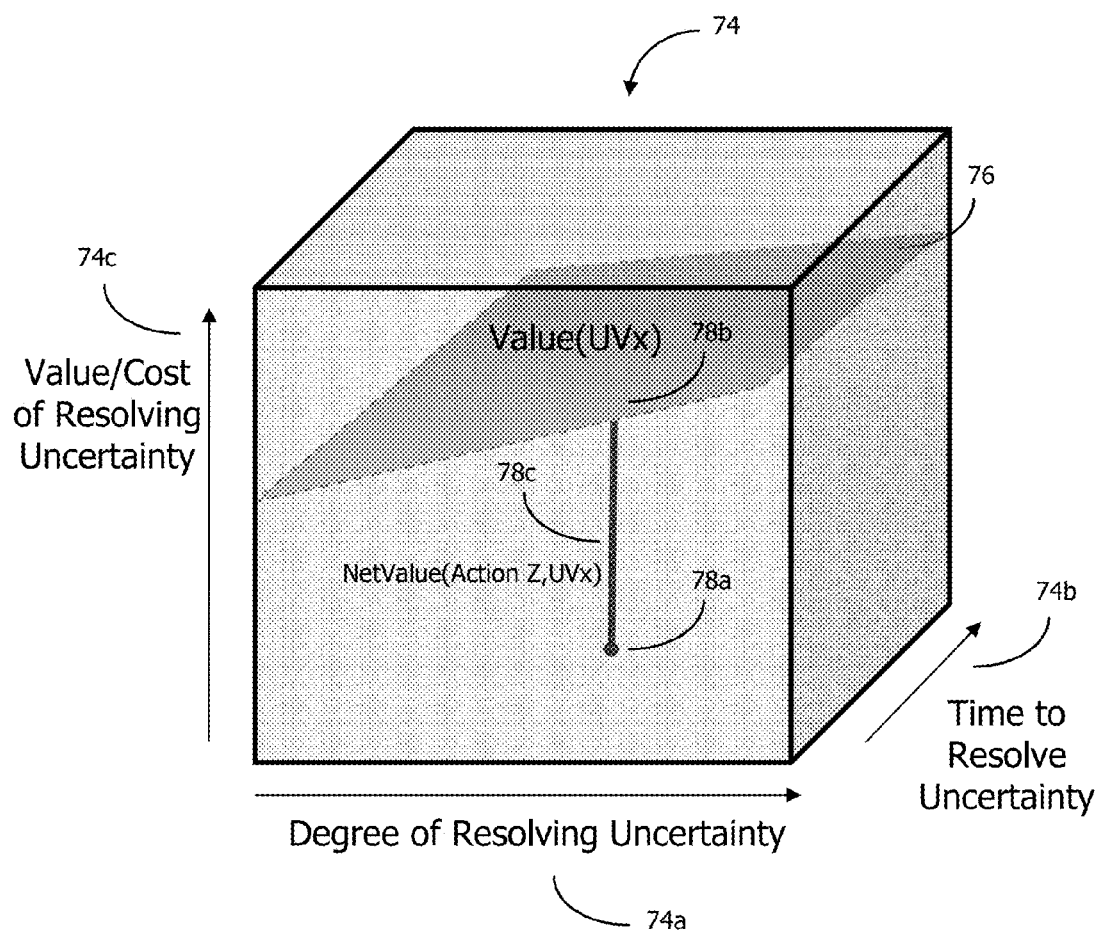
FIG. 7 is a diagram of a net action value framework, according to some embodiments.

FIG. 7 depicts a framework 74 for evaluating the value of actions 333 versus the cost of actions 333 to resolve uncertainty that may be applied by the value of information function 342 of the adaptive decision process 300, in some embodiments. The framework 74 comprises three dimensions. The first dimension 74a is the degree to which the action is expected to resolve uncertainty. The second dimension 74b is the expected time it will take to perform the action and interpret the results of the action to resolve the uncertainty. The third dimension 74c is the expected value and cost of taking the associated action to resolve the uncertainty. A value map 76 of all values of information associated with a potential set of actions relating to a particular uncertain variable, UVx is shown. One particular action, "Action Z", selected from the set of all possible of these actions has an expected value as shown by point 78b of the value mapping 76. The associated cost of Action Z is shown as 78a. The net value of the action is therefore the difference 78c. This difference may be generally described by the function NetValue (Action Z, UVx). Although not shown in FIG. 7, an action may provide valuable information associated with more than one uncertain variable. In such cases the total net value of the action in the summation of the net values of the action across all uncertain variables.

The net value of all possible actions associated with the uncertain variables 318 of the decision model 310 may be calculated, such that those actions with a positive net value may be considered for execution. If two or more actions both have positive net value but are mutually exclusive, then the one with the greater net value may be selected for execution, as one possibility.

Alternatively, a budget limit or constraint may be imposed. In these cases, the net value of all possible actions may be ranked, and a cumulative cost may be generated by the value of information function 342, starting with the highest positive net value action and ending with the lowest positive net value action. All actions may be executed that are associated with cumulative cost less than or equal to the budget constraint.

The net values of information associated with multiple actions may not be completely independent, and therefore simple summations of the net values of the actions may not be appropriate. Rather, sets of actions may be considered, and the set of actions with the highest net value may be selected, conditional on budgetary or other cost limitations, and conditional on the collective duration of the set of actions. The collective duration of the set of actions is a function of the degree to which actions may be conducted in parallel as opposed to being conducted in sequence.

Design of experiment approaches may be employed by the design of experiment function 344, to contribute toward making the most effective choices on actions 333. These approaches may include, but are not limited to, applying factorial experimental designs, or other design of experiment decision techniques such as D-optimal designs, or applying statistical learning models, such as nearest neighbor models, support vector machine models, or neural network models.

In accordance with the net action value framework 74, the design of experiment function 344 may determine actions to perform within the context of information gathering means 350. The one or more actions determined may be within a certain type of information gathering means, or may be across multiple information gathering means types. For example, with regard to the information gathering means types depicted in FIG. 6B, the design of experiment function 344 may determine experimental actions to conduct within one type or class of information gathering means 350, say, high throughput testing 72b. In other embodiments, the design of experiment function 344 may determine experimental actions to conduct across more than one type or class of information gathering means 350, such as across high throughput testing 72b, bench-scale testing 72c, and pilot plant testing 72e.

Experimental Design and Inferencing Functions

Recall from FIG. 2 that the adaptive decision process 300 may include an experimental design and inferencing process 340. The experimental design and inferencing process 340 addresses uncertainties that may exist with regard to uncertain variables 318 in the decision model 310. In FIGS. 8-13, the functions of the experimental design and inferencing process 340 are described in more detail.

In FIG. 8, an uncertainty mapping 341A is depicted, according to some embodiments. The uncertainty mapping 341A represents correspondences between expected future states 316 and associated uncertain variables 318 of the decision model 310. In the mapping 341A, each row is a pair-wise association between a specific expected future state and a specific uncertain variable. For example, in row 402, "expected future state 1" has a single associated uncertain variable, "uncertain variable 1" 422. However, an expected future state 316 may have more than one associated uncertain variables. For example, as shown in rows 404, 406, and 408, "expected future state 2" has three associated uncertain variables, "uncertain variable 1", "uncertain variable 2", and "uncertain variable 3".

An uncertain variable may be not unique to a specific expected future state 316. For example, expected future state 2 and expected future state 3 both have a common corresponding uncertain variable 2 (rows 406 and 410). Or, the uncertain variable may be unique to a particular expected future state 316. For example, uncertain variable 4 is unique to expected future state 3 in the uncertainty mapping 341A.

One or more uncertainty mappings 341A may be included within the uncertainty mapping function 341 of the experimental design and inferencing function 340. The one or more uncertainty mappings 341A may be generated or modified by the uncertainty mapping function 341 as new inferences are delivered from 328a the statistical inferencing function 346. The one or more uncertainty mappings 341A may be stored within a computer-based system, preferably through a database management system, such as a relational database system.

In FIG. 9, a mapping of probabilistic models, data, and values of information to uncertain variables is depicted, according to some embodiments, described herein for convenience as a value of information mapping 342A. Recall that the value of information function 342 enables a determination of absolute and relative values of perfect or imperfect information associated with uncertain variables 318 within the decision model 310, as defined by the uncertainty mappings 341 (see FIG. 2). The value of information mapping 342A depicted in FIG. 9 represents correspondences between uncertain variables 318, probabilistic models 424, data or information sets 426, and uncertain variable (UV) specific values of information 428. The probabilistic models 424 associated with uncertain variables 422 may include one or more discrete or continuous probability density or distribution functions. Bayesian models may be applied, where appropriate. The data sets 426 associated with uncertain variables 422 represent a corresponding collection of relevant raw data, processed data or information, and/or insights or knowledge derived from the data and information. In Bayesian terms, data sets 426 may be interpreted as the prior state of information. Some or all of data sets 426 may be included in information base 360.

The uncertain variable-specific values of information 428 associated with uncertain variables 318 represent the expected gross value of attaining varying degrees of additional information incremental to the existing body of information or data sets 426 associated with the uncertain variables 318. The uncertain variable-specific values of information 428 may be generated by applying the uncertainty resolution value framework 66 of FIG. 5.

The gross (meaning not net of costs to resolve the uncertainty) uncertain variable-specific value of information 428 is determined from the expected financial or non-financial values associated with expected future states or outcomes 316, combined with levels of certainty associated with the outcomes of the corresponding uncertain variable 422. The evaluation function 320 may be applied in assisting in the determination of the value of information. The uncertain variable-specific values of information 428 may therefore include multiple expected values, each expected value corresponding to a different set of potential incremental data or information 426, such that each data set 426 have a corresponding expected effect on the level of uncertainty associated with the value. The uncertain variable-specific value of information 428 may be represented by a mathematical function that represents the gross value of information as a function of the degree of certainty associated the uncertain variable 422. One particular value that may be calculated is the (gross) value of perfect information, which is defined as the value of attaining perfect foresight on the outcome of the corresponding uncertain variable. Attaining less than perfect foresight, or imperfect information, may also provide value, but the gross value of imperfect information can be no greater than the bound that is set by the gross value of perfect information.

The gross (i.e., prior to subtracting the cost of attaining the information) uncertain variable-specific value of information 428 for one or more degrees of certainty associated with an uncertain variable 422 may be calculated from the application of decision tree models, decision lattices, simulations, dynamic programming, or other modeling techniques. Design of experiment modeling, including, but not limited to, factorial matrices, D-optimal and statistical learning models, may be applied to derive value of information 428 either directly or as a by-product of experimental design determinations. In addition, statistical learning models, such as support vector machine modeling may be directly applied to derive, or assist in the derivation, of value of information.

One or more value of information mappings 342A may be included within the value of information function 342 of the experimental design and inferencing function 340. The one or more value of information mappings 342A may be generated or modified by the value of information function 342. The one or more value of information mappings 342A may be stored within a computer-based system, preferably through a database management system, such as a relational database system.

Figure 10:
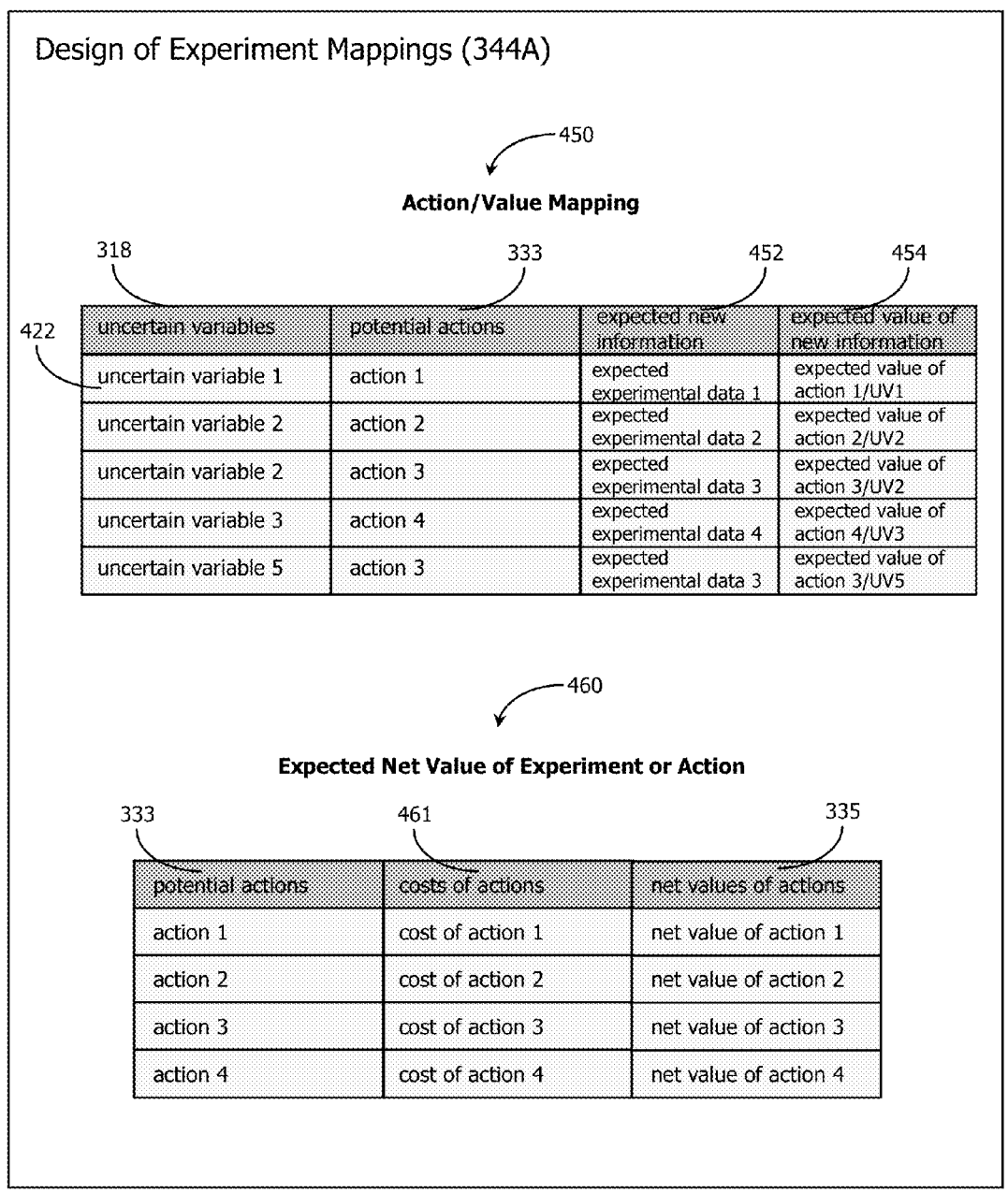
FIG. 10 is a diagram of a design of experiment mapping applied by the adaptive decision process of FIG. 2, according to some embodiments.

In FIG. 10, a design of experiment mapping 344A is depicted, according to some embodiments. One or more design of experiment mappings 344A may be included in design of experiment function 344 of the experimental design and inferencing function 340. Recall that, in addition to determining the action-specific value of information, the expected cost of conducting experiments or gathering information may also be incorporated by the design of experimental design function 344 in determining an effective information gathering plan. The design of experiment mapping 344A includes an action/value mapping 450 and an expected net value of experiment or action mapping 460. It should be understood that "experiment" represents just one type of the more general class of "information gathering actions" 336 or just "actions" 314.

The action/value mapping 450 represents correspondences between uncertain variables 318 and information gathering actions 333, and the information gathering actions 333 and expected new information generated by each potential action 452, and the corresponding uncertain variable-specific gross value of information associated with each potential action 454. As shown in the action/value mapping 450, each uncertain variable 318 may have one or more actions 333 associated with it. An action 333 may contribute to uncertainty resolution of one or more uncertain variables 318. The total expected gross value of an action 314, 336 may be calculated by summing its contributions to the resolving uncertainty across all the uncertain variables 318 it is expected to effect. So, for example, in FIG. 10, the expected gross value of information of "action 3" would be the sum of its contributions to resolving uncertainties associated with both "uncertain variable 2" and "uncertain variable 5".

The expected net value of experiment or action mapping 460 represents correspondences between actions 333 the costs of the actions 461, and the net values of the actions 335. The net value of the action 335 is calculated by subtracting the cost of the action 461 from the expected gross value of information associated with the action 333. The expected gross value of information of the action is calculated by summing the value contributions of the action across uncertain variables in the action/value mapping 450 of FIG. 10.

The design of experiment function 344 may include algorithms to assess a collection of actions 333 wherein the individual actions 333 do not necessarily produce independent results 452, to determine what subset of the collection of actions to conduct in a first time period. In other words, where the collection of actions may result in an "overlap" associated with incremental information 452 generated by individual actions 333, in the sense of the associated incremental information 452 generated by the actions 333 having some degree of correlation; the design of experiment function 344 may assess collections of actions rather than just individual actions. In such cases, the design of experiment function 344 will assess the net value of information associated not only with the individual actions within the collection of actions, but also with the net value of information associated with subsets of the collection of actions. The design of experiment function 344 may include processes or algorithms based on design of experiment modeling such as factorial matrices or D-optimal models, or statistical learning models, such as support vector machine models, or Bayesian models.

Figure 11:
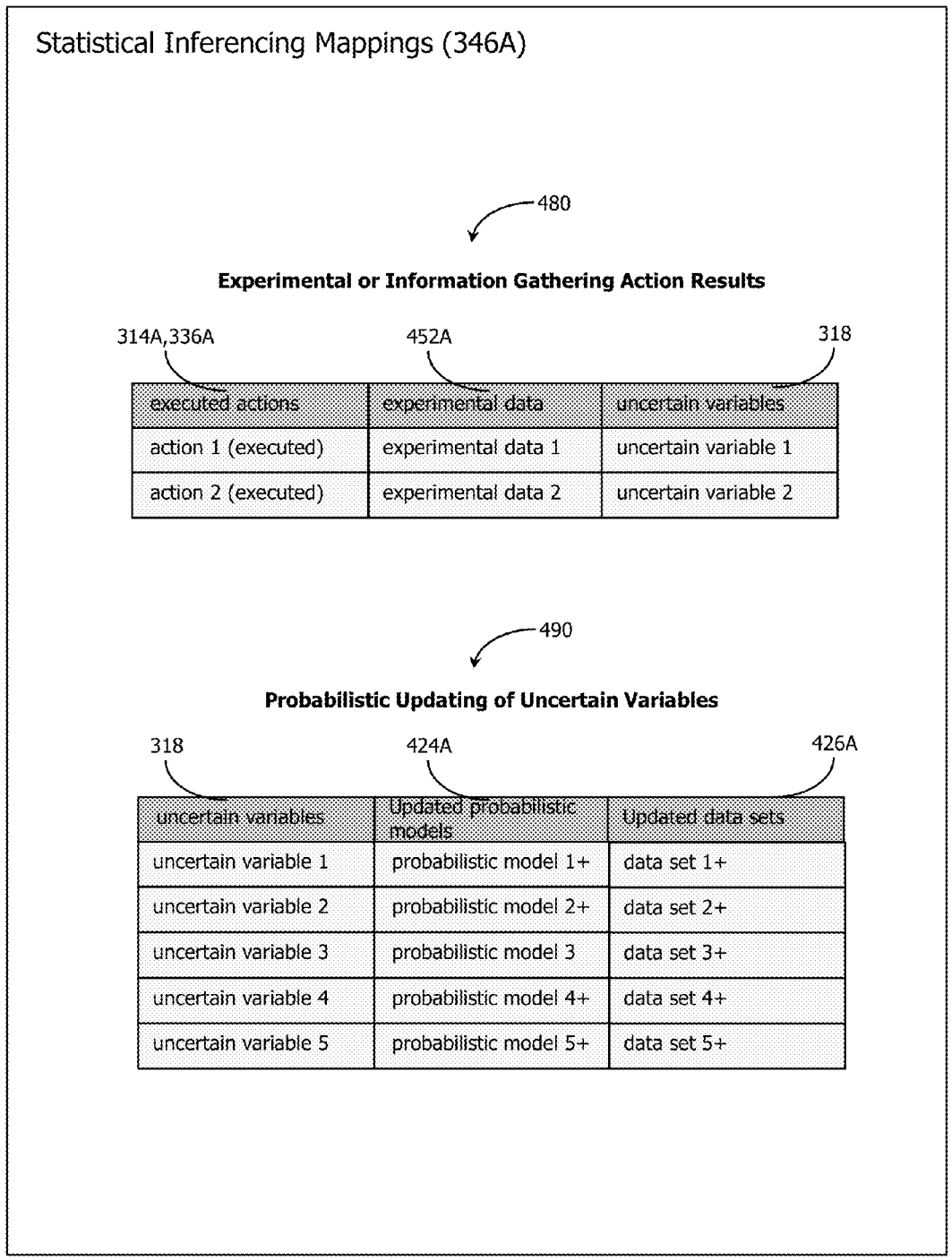
FIG. 11 is a diagram of a statistical inferencing mappings applied by the adaptive decision process of FIG. 2, according to some embodiments.

In FIG. 11, a statistical inferencing mapping 346A is depicted, which may be included in the statistical inferencing function 346 of the experimental design and inferencing function 340, according to some embodiments. The statistical inferencing mapping 346A includes an experimental or information gathering action results mapping 480 and a probabilistic updating of uncertain variables mapping 490. The experimental or information gathering action results mapping 480 represents a mapping of executed actions 314A,336A (corresponding to potential actions 314,336), experimental data attained by the executed actions 452A, and the uncertain variables 318 to which the experimental data attained by the executed actions 314A,336A corresponds. A specific instance of the attained experimental data 452A may map to more than one of the uncertain variables 318.

The probabilistic updating of uncertain variables mapping 490 represents the mapping of uncertain variables 318 to updated probabilistic models 424A and updated data sets 426A (the instances of the updated probabilistic models 424A and data sets 426A are designated as updated by appending the "+" symbol to the corresponding items in the probabilistic updating of uncertain variables map 490). The updated data sets 426A represent the body of data, information or knowledge associated with an uncertain variable 318 after the experiment or information gathering action 333 has been conducted and the results assimilated.

The updated data sets 426A therefore represent the additional information 452A from the experimental or data gathering actions 314A,336A added to the corresponding previously existing data sets 426. In some cases, the probability densities associated with probabilistic models 424A may be unchanged after the data sets 426A are updated based on the newly attained information. In other cases, the probability densities associated with the updated probabilistic models 424A may change. The changes may relate to parameters associated with the probability density (for example, the variance parameter associated with a Gaussian density function), or the probability density function itself may change (for example, a Gaussian density function changing to a log normal density function). Statistical processes or algorithms may be used to directly make inferences (i.e., the statistical processes or algorithms may comprise a probabilistic model 424) or be applied to update probabilistic models 424A based on the new information. Statistical modeling techniques that may be applied include linear or non-linear regression models, principal component analysis models, statistical learning models, Bayesian models, neural network models, genetic algorithm-based statistical models, and support vector machine models.

Figure 12:
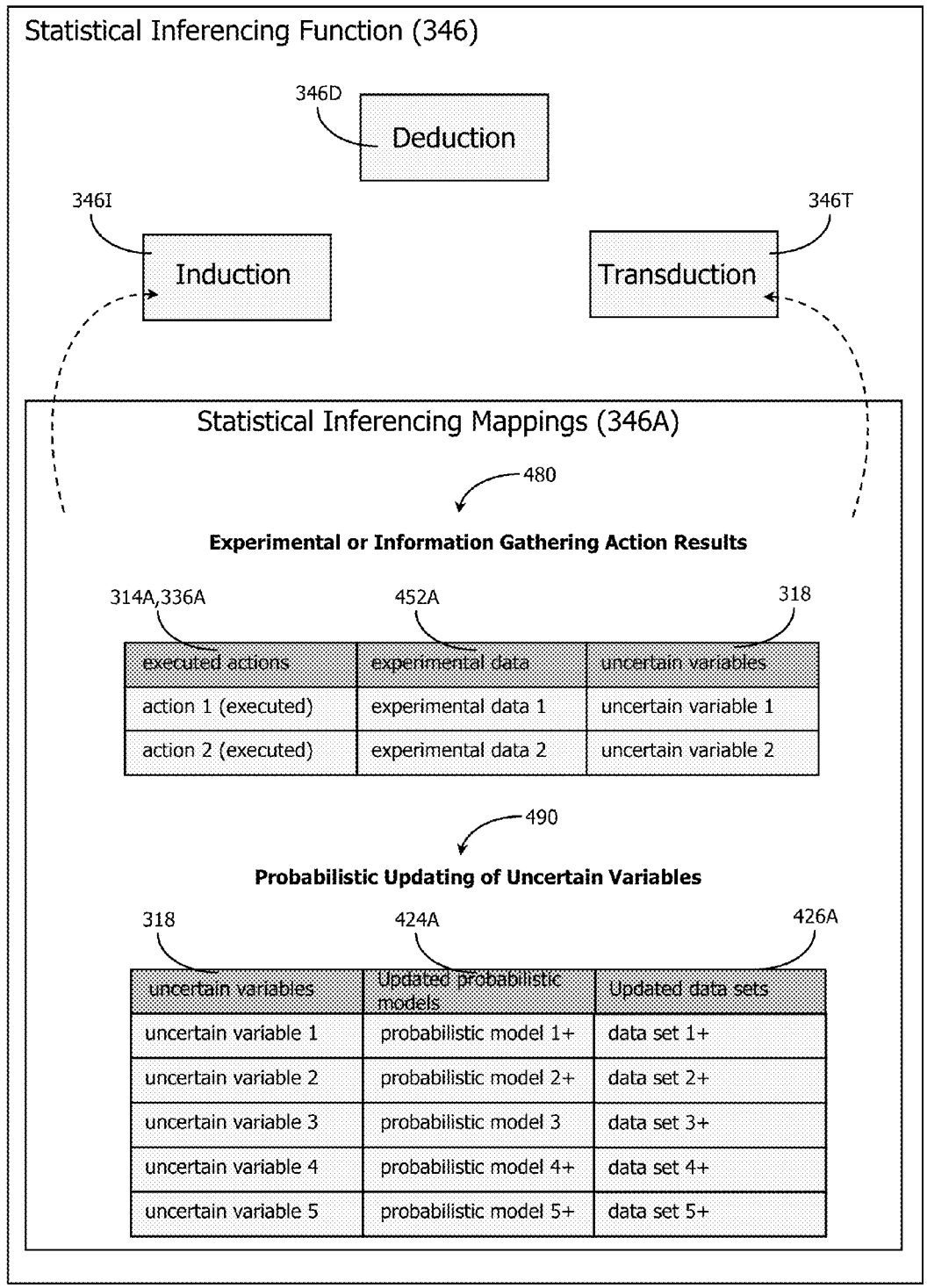
FIG. 12 is a diagram illustrating additional aspects of the statistical inferencing function, according to some embodiments.

In FIG. 12, the statistical inferencing function 346 is depicted, according to some embodiments. Statistical inferencing function 346 includes the general inferencing functions deduction 346D, induction 346I, and transduction 346T. Induction 346I and transduction 346T are both driven by the assimilation of new data or information 452A, as reflected in the mappings 480 and 490 from the statistical inferencing mapping 346A. Induction 346I is a generalization function that uses specific data or information to derive a function, in this case a probabilistic function or model 424A, to enable a general predictive model. In other words, the induction function 346I preferably seeks to find the best type of probability density function 424A to fit the data available 426A. Once a probabilistic model 424A is in place, the model can be used by the deduction function 346D to predict specific values from the generalized model.

Transduction 346T is a more direct approach to predicting specific values than induction 346I and deduction 346D. Applying a transduction approach recognizes that, under some circumstances, there may be no reason to derive a more general solution than is necessary, i.e. deriving an entire density function from data. That is, some level of useful predictive capabilities may be possible without deriving an entire density function for an uncertain variable. This may be particularly the case when the body of existing data 426A is relatively sparse. The transduction function 346T may be based on an empirical risk minimization (ERM) function applied to appropriate data sets, or training sets. Or, alternative functions may form the basis of the transduction. ("The Nature of Statistical Learning Theory," Vapnik, 2000, provides a review of transduction and statistical learning.)

The deduction function 346D or the transduction function 346T may inform the design of experiment or information gathering process 344. Thus, output from the statistical inferencing function 346 may directly or indirectly feed back 328, automatically or with human assistance, to the design of experiment function 344, thereby enabling an adaptive design of experiment process.

Figure 13:
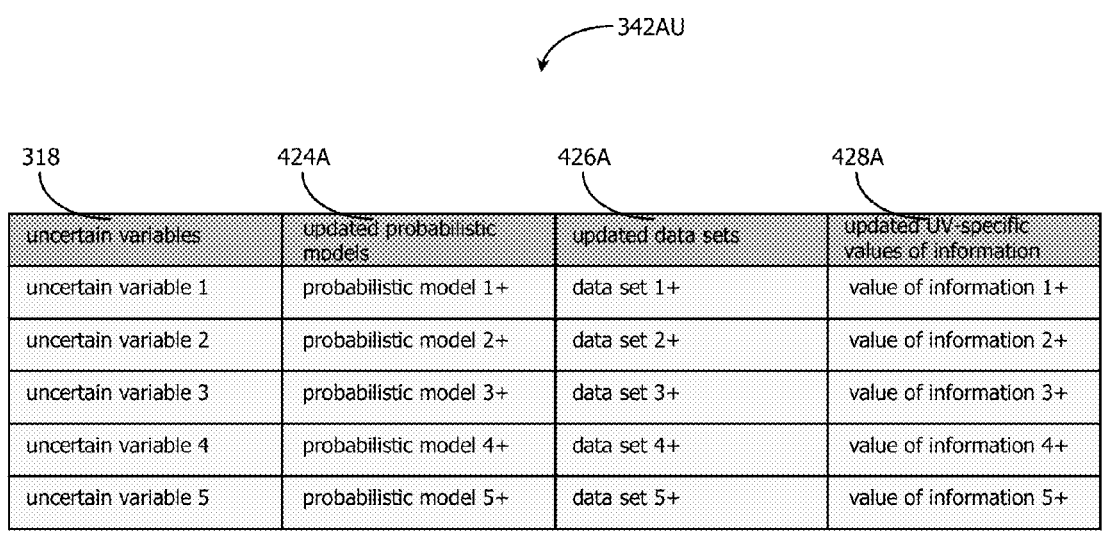
FIG. 13 is a diagram illustrating the updating of uncertainty mappings and values of information, according to some embodiments.

In FIG. 13, an updated version 342AU of the value of information mapping 342A of FIG. 9 is shown, after conducting experiments or information gathering, and assimilating the information within the experimental design and inferencing function 340. Uncertain variables 318 have corresponding updated probabilistic models 424a, updated data sets 426a, and updated values of information 428a. The updated values of information 428a are derived from the value models associated with the decision model 310, the evaluation function 320, the uncertainty mappings 341A, the updated probabilistic models 424a, and the updated data sets 426A.

Hence, in some embodiments, a closed loop process is enabled, integrating design of experiment 344, statistical inferencing 346, and value of information 342. This closed loop 716 process may be fully or partially automated within a computer-based system.

Statistical Learning Applications

In some embodiments, statistical learning approaches may be applied by the design of experiment function 344 to derive the next experiment or action or set of experiments or actions to conduct. Such statistical learning approaches may include application of support vector machine models or algorithms.

Support vector machine models seek to segment or classify sets of data spanning multiple attribute dimensions. The classification of data points is carried out by determining a separating hyper plane (or an equivalent non-linear functional construct) that minimizes error, while also maximizing the distance between the closest data points of the two separated data set segments and the hyper plane.

Figure 14:
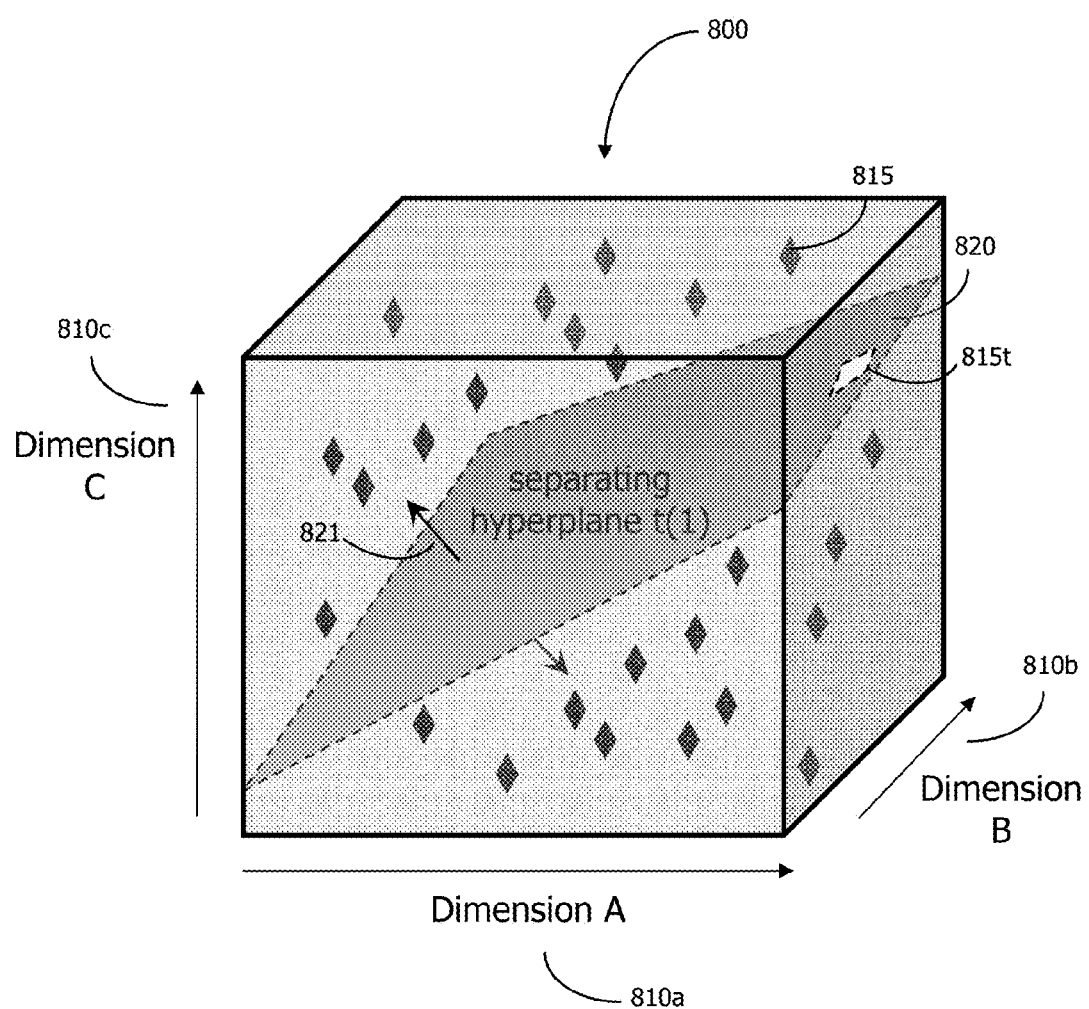
FIG. 14 is a diagram of a support vector machine design of experiment implementation, according to some embodiments.

FIG. 14 illustrates a three dimensional attribute space example. A support vector machine model of a three dimensional attribute space 800 is comprised of three dimensions 810*a*, 810*b*, and 810*c* corresponding to three different attributes of the decision model 310. For example, in decision framework 311*c*, the attributes may correspond to quantities of components 314*ca*. A set of data points 815 populate the attribute space 800.

A separating hyper plane 820 is determined that optimally separates two sets of data points in the attribute space. The separating hyper plane optimizes the width of the margin 821 around it as described above.

The hyper plane 820 can therefore be thought of as representing the set of points in the attribute space representing the greatest uncertainty with regard to classification. So, for example, in a product testing application, points on one side of the hyper plane (plus the margin) may correspond to a successful product, while points on the other side may correspond to product failures. However, it may be the case that predominantly higher cost components 314*ca* are required to achieve the properties 316*p*4 that constitute success. Therefore there may be a strong incentive to increase the sharpness regarding the components 314*ca* or other variables that influence success and failure.

Therefore, points on the separating hyper plane constitute a set of attributes that is useful to test to maximize the expected resolution of uncertainty. In particular, a point 815*t* on the separating hyper plane 820 that represents the narrowest margin between the separating hyper plane 820 and the separated data sets may constitute a particularly good experiment or action 333 to conduct as it can be expected to provide maximum information with regard to resolving uncertainty associated with the boundary between the two sets of data.

It should be noted that the exact point in the attribute space selected to conduct as an experiment 333 may be tuned on the basis of other factors related to the attributes comprising the attribute space 800. For example, if the cost of an attribute is not modeled as a specific, separate attribute of attribute space 800, cost considerations may be overlaid on the candidate experiments derived by the support vector machine model. In general, additional optimization algorithms may be applied to take into account attributes and other variables not explicitly incorporated in attribute space 800.

Figure 15:
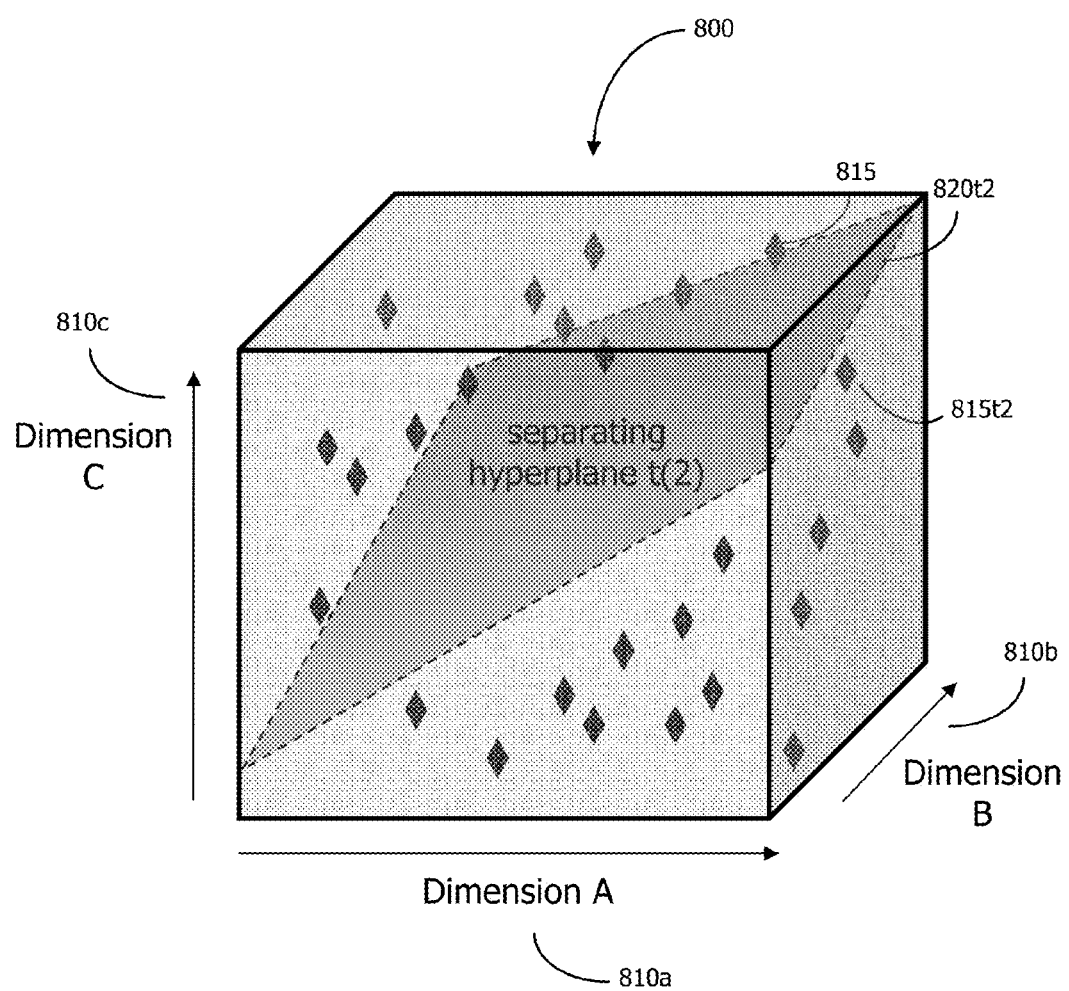
FIG. 15 is a diagram of a support vector machine design of experiment implementation step based on FIG. 14, according to some embodiments.

FIG. 15 illustrates a possible result of the experiment, in which the data point 815*t*2 resulting from the experiment 815*t* drives the derivation of a new separating hyper plane 820*t*2. This process of conducting experiments and re-deriving an new separating hyper plane may continue indefinitely until a separating margin 821 is achieved that is smaller than a specified threshold; or by applying more global valuation functions, until it is determined that the net value of the next candidate experiment 336 is no longer positive.

In some embodiments, support vector machine models, or the same model, may be applied by either or both the design of experiment function 344 and the statistical inferencing function 346. Furthermore, the margin 821 of the separating hyperplane at each step of application of the support vector machine model may provide input 326*a* or 329 to the value of information function 342.

Information Gathering Infrastructure Decisions

As described above, in addition to adaptive decision process 300 applying the value of information function 342 and/or the design of experiment function 344 to determining the value associated with a specific decision associated with a decision model 310, the value of information function 342 and/or the design of experiment function 344 may also be semi-automatically or automatically applied to decisions regarding the means of information gathering or experimental infrastructure 350 that would improve decision making in the future. Such decisions may be considered a "meta-meta-decision".

In accordance with some embodiments, FIG. 16 is a flow chart of an adaptive experimental infrastructure process 600. The first step 602 of the process is the establishment of one or more decision models 310 and corresponding evaluation criteria 320.

Corresponding to, and/or applying, the value of information function 342 and/or the design of experiment function 344 of the experimental design and inferencing function 340 of FIG. 2, the expected net value of actions 333 specifically associated with providing information to resolve uncertainties of uncertain variables of the one or more decision models 310 is then determined 604. The actions 333 may be unconstrained by the current infrastructure of the information gathering means 350. Rather, for the adaptive experimental infrastructure process 600, simulated infrastructure options may be established or generated, and the value of information function 342 and/or the design of experiment function 344 may then be applied to generate net value 335 of actions 333 associated with these simulated or possible infrastructures to be potentially included in information gathering means 350. The simulated infrastructures may include different types of information gathering infrastructure and/or different capacities of specific types of information gathering infrastructure.

The value of information of the actions 333 associated with the one or more expected future direct decisions 312 and corresponding information gathering decisions 331 may be aggregated to determine the value of various simulated test infrastructure alternatives within information gathering means 350. The value of information function 342 and/or the design of experiment function 344 may be integrated, and may be applied recursively in a "look ahead and work backwards" process to derive the value of various simulated test infrastructure alternatives. Dynamic programming models incorporating stochastics may be applied to calculate the value of the various simulated test infrastructure alternatives.

The expected value of infrastructure options is then determined 606 by subtracting the expected fixed costs of each potential infrastructure alternative, as well as the expected associated variable costs of each potential infrastructure alternative, from the expected value of information gains from the expected use of the of each potential infrastructure alternative infrastructure within information gathering infrastructure 350. The simulated infrastructure alternatives associated with information gathering infrastructure 350 may include, but is not limited to, for example, high throughput experimentation infrastructure for materials science or life sciences applications, digitized knowledge bases of content, and sensing instrumentation.

The net value of the simulated infrastructure alternatives, individually and/or in alternative combinations, is checked 608 to determine if the corresponding net value is positive. If the answer is "no", then no infrastructure alternative is recommended for implementation.

If the answer is "yes", then the positive valued infrastructure alternatives or alternative combinations are prioritized based on the magnitude of value and/or other criteria. The infrastructure options to be implemented are determined 610 by combining value-based prioritizations of infrastructure alternatives and any additional decision criteria such as budgetary or timing constraints.

The selected infrastructure option or options may then be implemented 610. Once an infrastructure option is implemented 612, it becomes included in the information gathering means 350 that is fed back 614 to be used as a basis for determining the expected value of potential infrastructure options associated with one or more future decisions 312 in step 604 of the adaptive experimental infrastructure process 600 and/or as basis for determining the expected value of one or more actions 333 associated with a decision of step 704 the adaptive decision process.

In some embodiments, some or all of steps of the adaptive decision process as shown in FIG. 16 are automated through computer-based applications. Steps 602, 604, 606, 608, 612, and 614 may all be embodied in computer-based software, and each step may operate on a fully automatic basis, or on a semi-automatic basis (i.e., requiring some level of human intervention). The process step of implementing the infrastructure option 612 may be fully automated when the infrastructure is embodied in computer applications, such the generation of new knowledge bases. The process step of implementing the infrastructure option 612 may also be automated where the infrastructure comprises computer-based and/or robotic systems that are capable of self-assembly.

In some embodiments, the adaptive experimental infrastructure process 600 may apply the methods and/or systems of Generative Investment Process as disclosed in PCT Patent Application No. PCT/US2005/001348, entitled "Generative Investment Process." In such embodiments, the infrastructure options may comprise a combinatorial portfolio of investment opportunities.

Figure 17:
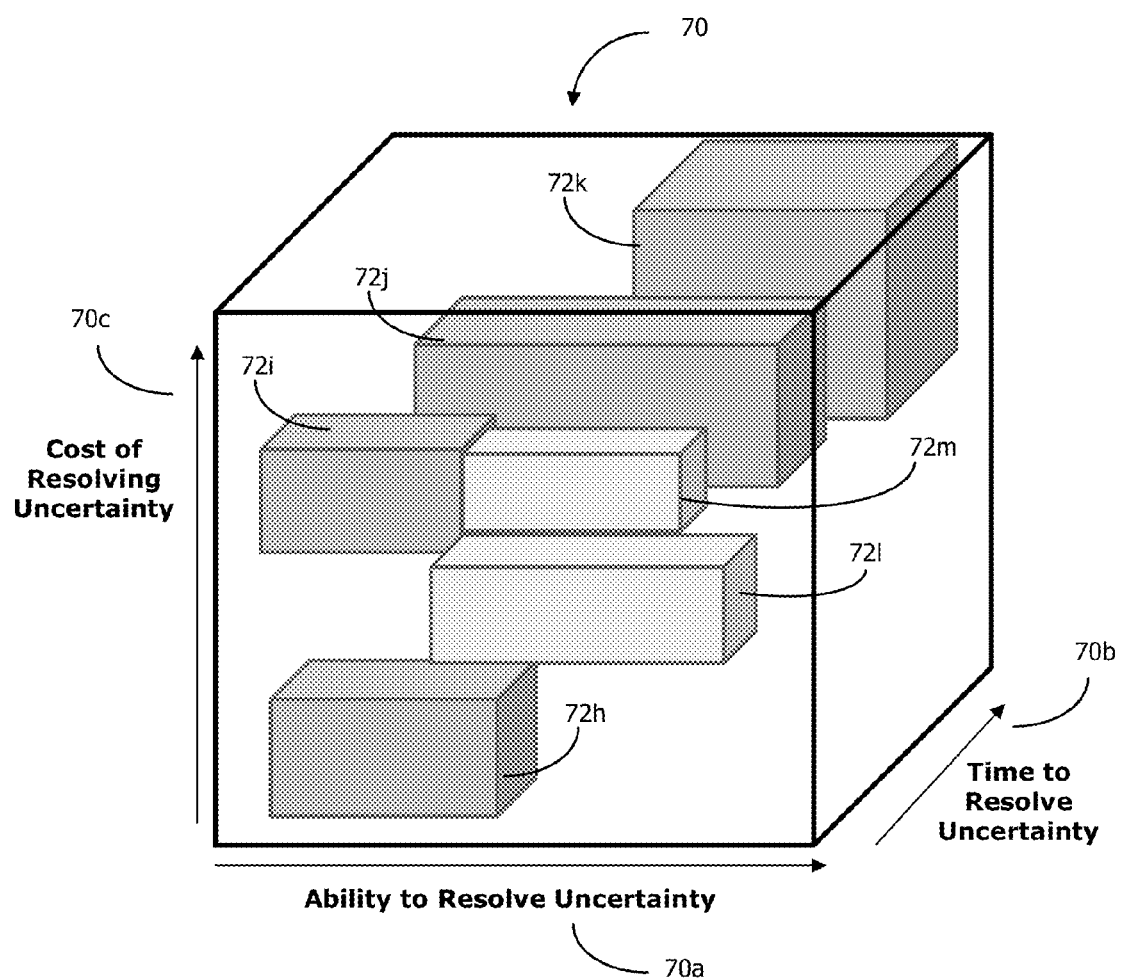
FIG. 17 is a diagram of an example outcome of the experimental infrastructure decision process of FIG. 16, according to some embodiments.

FIG. 17 illustrates an example application of the adaptive experimental infrastructure process 600 in the context of the uncertainty resolution cost framework 70. Infrastructure types 72h, 72i, 72j, and 72k (dark shading) represent existing infrastructure within the information gathering means 350. The adaptive experimental infrastructure process 600 determines that additional possible infrastructure options should be implemented, designated as 721 and 72m (light shading). These new infrastructure options complement the existing infrastructure by providing differentiated degrees of cost, ability to resolve uncertainty, and time to resolve uncertainty.

Computer-Based Implementations of Adaptive Decision Process

Figure 18:
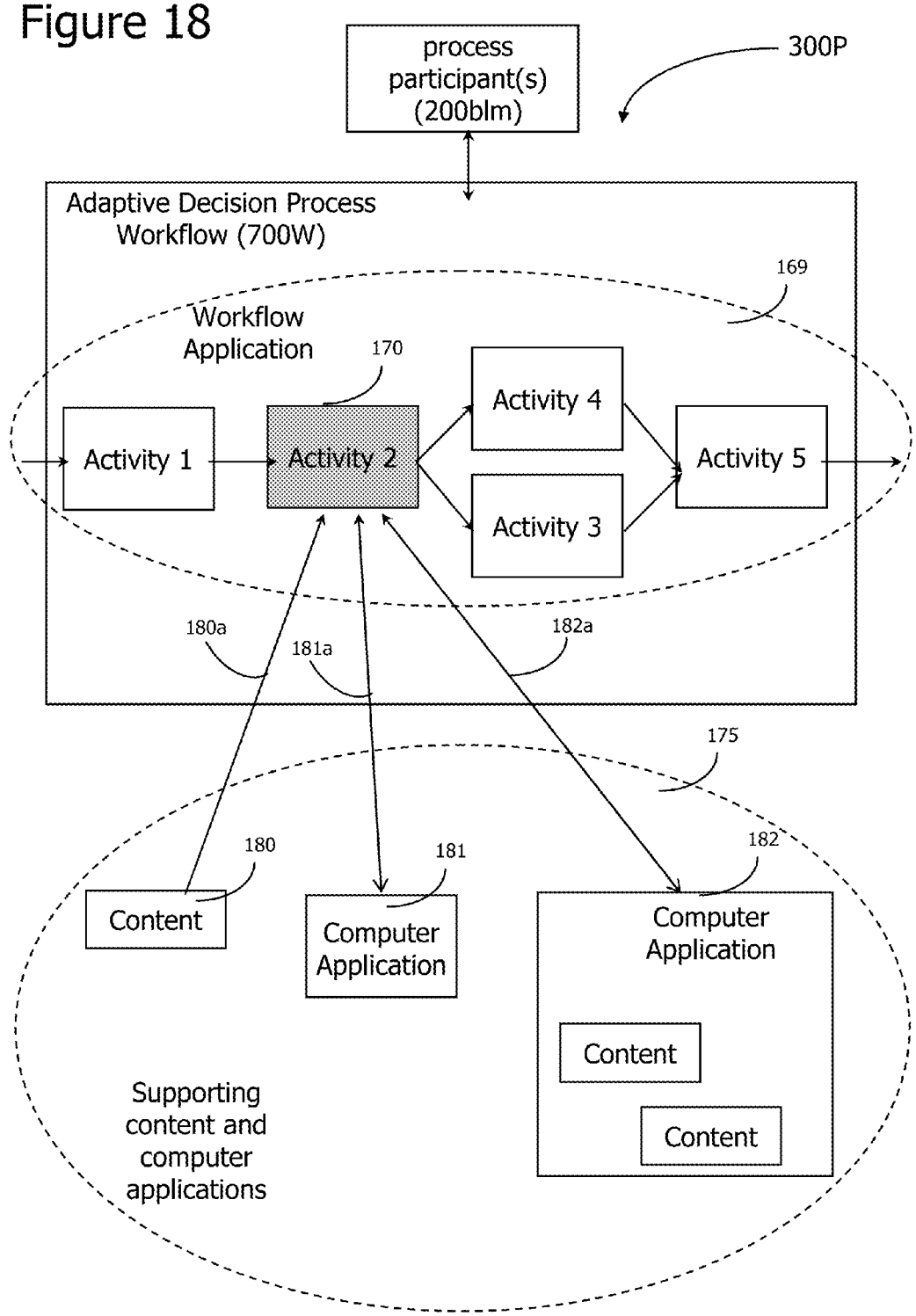
FIG. 18 is a diagram of a computer-based process implementation of the adaptive decision process of FIG. 2, according to some embodiments.

FIG. 18 illustrates a general approach to information and computing infrastructure support for implementation of adaptive decision process within a computer application-supported process. Some or all of the elements of the adaptive decision process 300 may be implemented as a computer-supported process 300P. The elements of the adaptive decision process model 300 may include activities, procedures, frameworks, models, algorithms, and sub-processes, and may map to process activities, sub-processes, processes, computer-based systems, content, and/or workflow of computer-supported process 300P. It should be understood that FIG. 18 represents an exemplary process instantiation 300P of the adaptive decision process 300.

In FIG. 18, the workflow of activities within an adaptive decision process 700W (corresponding to a "business process" implementation of the adaptive decision process logic flow 700 depicted in FIG. 3) may be managed by a computer-based workflow application 169 that enables the appropriate sequencing of workflow. Each activity, as for example "Activity 2" 170, may be supported by on-line content or computer applications 175. On-line content or computer applications 175 include pure content 180, a computer application 181, and a computer application that includes content 182. Information or content may be accessed by the adaptive decision process workflow 700W from each of these sources, shown as content access 180a, information access 181a, and information access 182a. One or more computer-based applications 181,182 may include some or all of the elements of the decision model 310, the evaluation function 320, the experimental design and inferencing function 340, the information gathering means 350 of FIG. 2. On-line content internal or external 180 to a computer-based application 182 may include experimental results 360.

For example, content 180 may be accessed 180a (a content access 180a) as an activity 170 is executed. Although multiple activities are depicted in FIG. 16, a process or sub-process may include only one activity. The term "content" is defined broadly herein, to include digitally stored text, graphics, video, audio, multi-media, computer programs or any other means of conveying relevant information. During execution of the activity 170, an interactive computer application 181 may be accessed. During execution of the activity 170, information 181a may be delivered to, as well as received from the computer application 181. A computer application 182, accessible by participants 200blm in the adaptive decision process 300P during execution of the activity 170, and providing and receiving information 182a during execution of the activity 170, may also contain and manage content such that content and computer applications and functions that support an activity 170 may be combined within a computer application 182. An unlimited number of content and computer applications may support a given activity, sub-process or process. A computer application 182 may directly contain the functionality to manage workflow 169 for the adaptive decision process workflow 700W, or the workflow functionality may be provided by a separate computer-based application.

Figure 19:
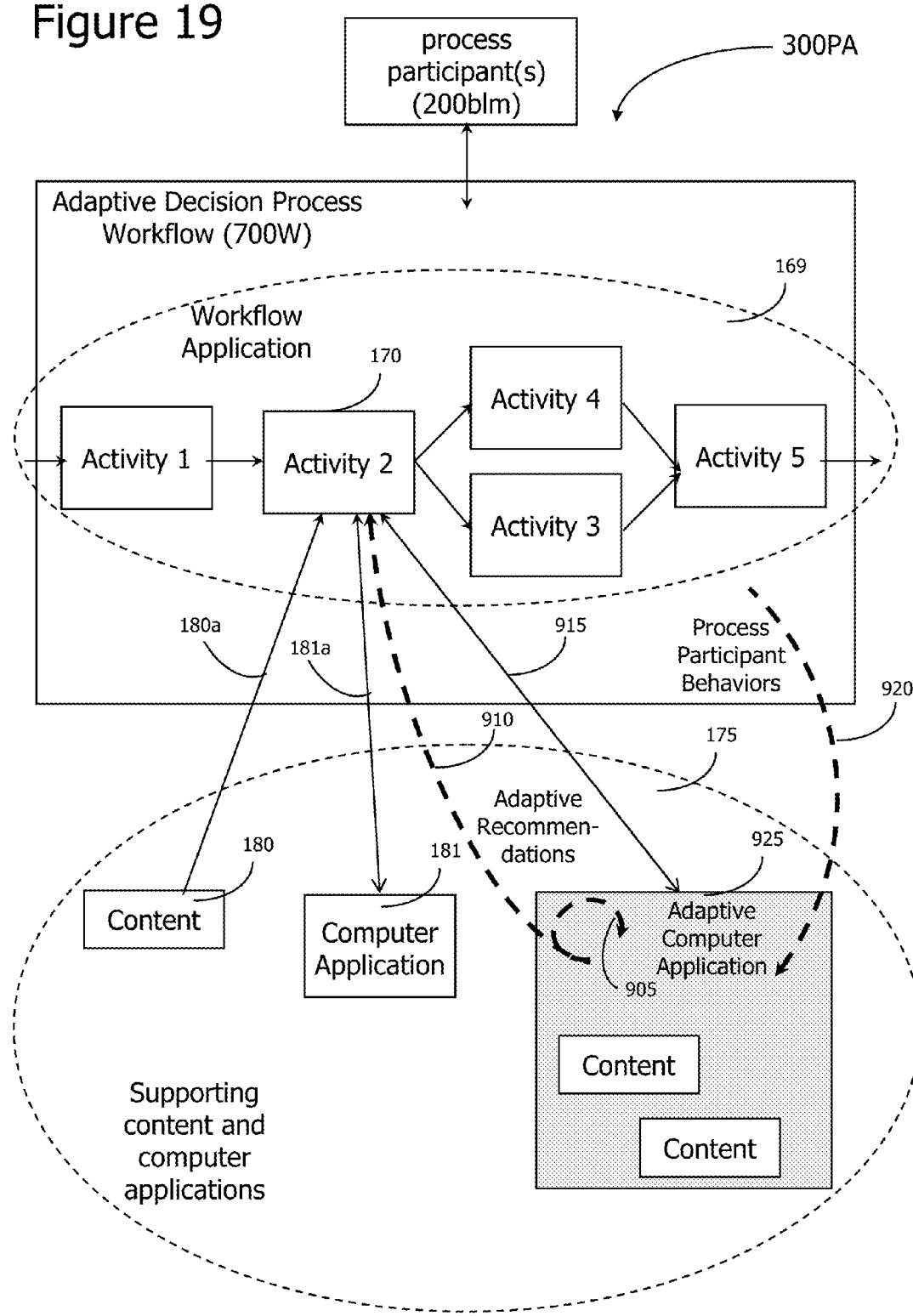
FIG. 19 is a diagram of an adaptive computer-based process implementation of the adaptive decision process of FIG. 2, according to some embodiments.

In accordance with some embodiments of the present invention, FIG. 19 depicts the application of adaptive recommendations to support an adaptive decision process workflow 700W. According to some embodiments, adaptive decision process may further be implemented as an adaptive process or sub-process. Adaptive decision process may apply the methods and systems disclosed in PCT Patent Application No. PCT/US2005/011951, entitled "Adaptive Recombinant Processes," filed on Apr. 8, 2005, which is hereby incorporated by reference as if set forth in its entirety.

In FIG. 19, the adaptive process implementation 300PA of adaptive decision process 300 may include many of the features of the adaptive decision process 300P in FIG. 18. Thus, the adaptive process implementation 300PA of adaptive decision process 300 features the workflow application 169, if applicable, with multiple activities 170, one or more of which may be linked. Further, the adaptive computer-based application 925 is depicted as part of supporting content and computer applications 175.

One or more participants 200*blm* in the adaptive process implementation 300PA generate behaviors associated with their participation in the process workflow 700W. The participation in the adaptive process implementation 300PA may include interactions with computer-based systems 181 and content 180, such as content access 180*a* and information access 181*a*, but may also include behaviors not directly associated with interactions with computer-based systems or content.

Process participants 200*blm* may be identified by the adaptive computer-based application 925 through any means of computer-based identification, including, but not limited to, sign-in protocols or bio-metric-based means of identification; or through indirect means based on identification inferences derived from selective process usage behaviors 920.

The adaptive process implementation 300PA of decision process 300 includes an adaptive computer-based application 925, which includes one or more system elements or objects, each element or object being executable software and/or content that is meant for direct human access. The adaptive computer-based application 925 tracks and stores selective process participant behaviors 920 associated with the adaptive process implementation 300PA. It should be understood that the tracking and storing of selective behaviors by the adaptive computer-based application 925 may also be associated with one or more other processes, sub-processes, and activities other than a process instance of adaptive process implementation 300PA. In addition to the direct tracking and storing of selective process usage behaviors, the adaptive computer-based application 925 may also indirectly acquire selective behaviors associated with process usage through one or more other computer-based applications that track and store selective process participant behaviors.

FIG. 19 also depicts adaptive recommendations 910 being generated and delivered by the adaptive computer-based application 925 to process participants 200*blm*. The adaptive recommendations 910 are shown being delivered to one or more process participants 200*blm* engaged in "Activity 2" 170. It should be understood that the adaptive recommendations 910 may be delivered to process participants 200*blm* during any activity or any other point during participation in a process or sub-process.

The adaptive recommendations 910 delivered by the adaptive computer-based application 925 are informational or computing elements or subsets of the adaptive computer-based application 925, and may take the form of text, graphics, Web sites, audio, video, interactive content, other computer applications, or embody any other type or item of information. These recommendations are generated to facilitate participation in, or use of, the adaptive process implementation 300PA, and associated processes, sub-processes, or activities. The adaptive recommendations 910 may include recommended actions 333 associated with one or more decisions 312 and/or associated information gathering decisions 331. The recommendations may be determined, at least in part, by combining the context of what the process participant is currently doing and the inferred preferences or interests of the process participant based, at least in part, on the behaviors of one or more process participants, to generate recommendations. The adaptive recommendations 910 may also be determined, at least in part, on the intrinsic characteristics of elements, objects or items of content of the adaptive computer-based application 925. These intrinsic characteristics may include patterns of text, images, audio, or any other information-based patterns, including statistical analysis of experimental information.

As the process, sub-process or activity of adaptive process implementation 300PA is executed more often by the one or more process participants, the recommendations adapt to become increasingly effective. Hence, the adaptive process implementation 300PA of decision process 300 can adapt over time to become increasingly effective.

Furthermore, the adaptive recommendations 910 may be applied to automatically or semi-automatically self-modify 905 the structure, elements, objects, content, information, or software of a subset of the adaptive computer-based application 925, including representations of process workflow. For example, the elements, objects, or items of content of the adaptive computer-based application 925, or the relationships among elements, objects, or items of content associated with the adaptive computer-based application 925 may be modified 905 based, at least in part, on inferred preferences or interests of one or more process participants. These modifications may be based solely on inferred preferences or interests of the one or more process participants 200*blm* derived from process usage behaviors, or the modifications may be based on inferences of preferences or interests of process participants 200*blm* from process usage behaviors integrated with inferences based on the intrinsic characteristics of elements, objects or items of content of the adaptive computer-based application 925. These intrinsic characteristics may include patterns of text, images, audio, or any other information-based patterns, including statistical analysis of experimental information.

For example, inferences based on the statistical patterns of words, phrases or numerical data within an item of content associated with the adaptive computer-based application 925 may be integrated with inferences derived from the process usage behaviors of one or more process participants to generate adaptive recommendations 910 that may be applied to deliver to participants in the process; or may be applied to modify 905 the structure of the adaptive computer-based application 925, including the elements, objects, or items of content of the adaptive computer-based application 925, or the relationships among elements, objects, or items of content associated with the adaptive computer-based application 925.

Structural modifications 905 applied to the adaptive computer-based application 925 enables the structure to adapt to process participant preferences, interests, or requirements over time by embedding inferences on these preferences, interests or requirements directly within the structure of the adaptive computer-based application 925 on a persistent basis.

Adaptive recommendations generated by the adaptive computer-based application 925 may be applied to modify the structure, including objects and items of content, of other computer-based systems 175, including the computer-based workflow application 169, supporting, or accessible by, participants in the adaptive process implementation 300PA.

For example, a system that manages workflow 169 may be modified through application of adaptive recommendations generated by the adaptive computer-based application 925, potentially altering activity sequencing or other workflow aspects for one or more process participants associated with the adaptive process implementation 300PA.

In addition to adaptive recommendations 910 being delivered to process participants 200blm, process participants 200blm may also access or interact 915 with adaptive computer-based application 925 in other ways. The access of, or interaction with, 915 the adaptive computer-based application 925 by process participants 200blm is analogous to the interactions 182a with computer application 182 of FIG. 18. However, a distinguishing feature of adaptive process implementation 300PA is that the access or interaction 915 of the adaptive computer-based application 925 by process participants 200blm may include elements of the adaptive computer-based application 925 that have been adaptively self-modified 905 by the adaptive computer-based application 925.

System Configurations

Figure 20:
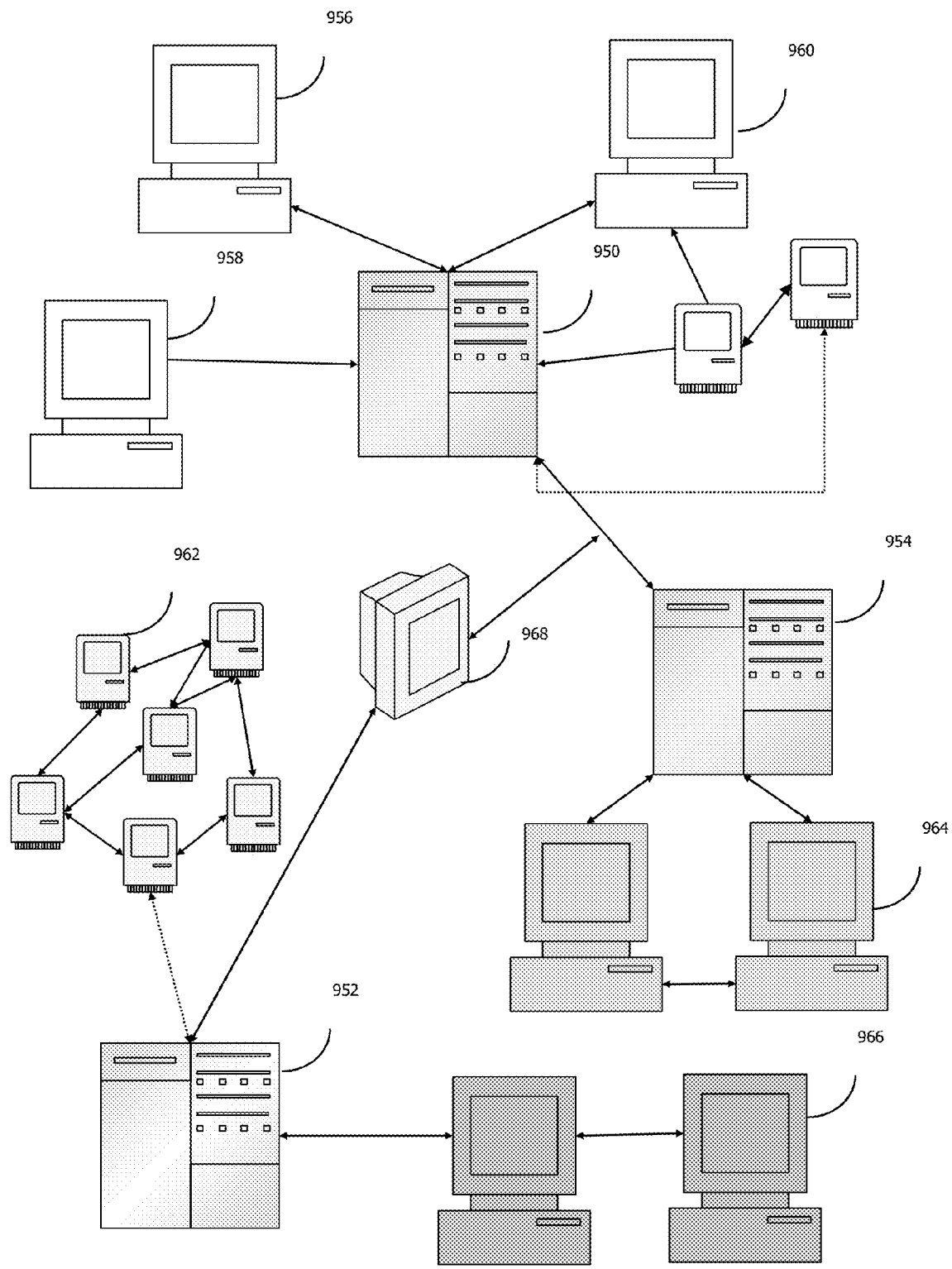
FIG. 20 is a diagram of alternative computer-based system configurations with which the adaptive decision process of FIG. 2 may operate, according some embodiments.

FIG. 20 depicts various hardware topologies that the system of the adaptive decision process 300, including the process-based system 300P and adaptive process implementation 300PA, may embody. Servers 950, 952, and 954 are shown, perhaps residing a different physical locations, and potentially belonging to different organizations or individuals. A standard PC workstation 956 is connected to the server in a contemporary fashion. In this instance, the adaptive decision process 300, or functional subsets thereof, such as the decision model 310, may reside on the server 950, but may be accessed by the workstation 956. A terminal or display-only device 958 and a workstation setup 960 are also shown. The PC workstation 956 may be connected to a portable processing device (not shown), such as a mobile telephony device, which may be a mobile phone or a personal digital assistant (PDA). The mobile telephony device or PDA may, in turn, be connected to another wireless device such as a telephone or a GPS receiver.

FIG. 20 also features a network of wireless or other portable devices 962. The adaptive decision process 300 may reside, in part or as a whole, on one or more of the devices 962, periodically or continuously communicating with the central server 952. A workstation 964 connected in a peer-to-peer fashion with other computers is also shown. In this computing topology, the adaptive decision process 300, as a whole or in part, may reside on each of the peer computers 964.

Computing system 966 represents a PC or other computing system which connects through a gateway or other host in order to access the server 952 on which the adaptive decision process 300 resides. An appliance 968, includes software "hardwired" into a physical device, or may utilize software running on another system that does not itself host the system upon which the adaptive decision process 300 is loaded. The appliance 968 is able to access a computing system that hosts an instance of the adaptive decision process 300, such as the server 952, and is able to interact with the instance of the adaptive decision process 300.

The adaptive decision process 300 may include computer-based programs that direct the operations of, or interacts with, robotic or other types of automated instrumentation or apparatus for the purposes of attaining additional information related to uncertain variables 318 associated with decision model 310. The automated instrumentation may include instrumentation that can be applied to materials testing, pharmaceutical testing, or general product formulation testing. The communication to and from such automated or semi-automated instrumentation may be through special process control software. Such automated or semi-automated instrumentation may be used to synthesize new materials or chemical formulations, or new pharmaceuticals. Further, the instrumentation may be applied to conduct combinatorial chemistry techniques. These techniques may include recombinant genetic techniques or the application of polymerase chain reaction (PCR) techniques. The adaptive decision process 300 further include the information gathering instrumentation or apparatus described herein, in addition to computer-based programs that control the said instrumentation or apparatus.

Information generated by instrumentation or apparatus may be directly communicated to the adaptive decision process 300, enabling a real-time feedback loop between information acquisition and the experimental design and inferencing function 340.

While the present invention has been described with respect to a limited number of embodiments, those skilled in the art will appreciate numerous modifications and variations therefrom. It is intended that the appended claims cover all such modifications and variations as fall within the scope of this present invention.

What is claimed is:

1. A computer-implemented method comprising:
determining automatically a first computer-controlled action that is expected to result in a reduction of uncertainty that is embodied by one or more probabilities;
performing automatically the first computer-controlled action;
updating automatically the one or more probabilities based upon an assessment of a result of the first computer-controlled action;
determining automatically a second computer-controlled action in accordance with the updated one or more probabilities and an expected value of information; and
performing automatically the second computer-controlled action.

2. The method of claim 1, further comprising:
performing automatically the first computer-controlled action, wherein the first computer-controlled action comprises a search of one or more computer-implemented knowledge bases.

3. The method of claim 1, further comprising:
performing automatically the first computer-controlled action, wherein the first computer-controlled action comprises a statistical analysis of computer-implemented content.

4. The method of claim 1, further comprising:
performing automatically the first computer-controlled action, wherein the first computer-controlled action comprises generating a recommendation that is delivered to a user of a computer-implemented system.

5. The method of claim 4, further comprising:
updating automatically the one or more probability distributions based upon the assessment of the result of the first computer-controlled action, wherein the result of the first computer-controlled action comprises an inference from behavioral information that is exhibited by the user in response to the recommendation.

6. The method of claim 1, further comprising:
performing automatically the first computer-controlled action, wherein the first computer-controlled action comprises modifying a structure of a computer-implemented system.

7. The method of claim 6, further comprising:
updating automatically the one or more probability distributions based upon the assessment of the result of the first computer-controlled action, wherein the result of first computer-controlled action comprises an inference from user behavioral information that is associated with the modified structure of the computer-implemented system.

8. The method of claim 1, further comprising:
determining automatically the second computer-controlled action in accordance with the updated one or more probabilities, the expected value of information, and an expected cost of the second computer-controlled action.

9. The method of claim 8, further comprising:
determining automatically the second computer-controlled action in accordance with the updated one or more probabilities, the expected value of information, the expected cost of the second computer-controlled action, and a utility function.

10. A system comprising one or more processor-based devices configured to:
determine a first computer-controlled action that is expected to result in a reduction of uncertainty that is embodied by one or more probabilities;
perform the first computer-controlled action;
update the one or more probabilities based upon an assessment of a result of the first computer-controlled action;
determine a second computer-controlled action in accordance with the updated one or more probabilities and an expected value of information; and
perform the second computer-controlled action.

11. The system of claim 10, further comprising the one or more processor-based devices configured to:
determine the first computer-controlled action, wherein the first computer-controlled action is determined, at least in part, by applying a neural network.

12. The system of claim 10, further comprising the one or more processor-based devices configured to:
determine the first computer-controlled action, wherein the first computer-controlled action is determined, at least in part, by a statistical learning-based function.

13. The system of claim 10, further comprising the one or more processor-based devices configured to:
perform the first computer-controlled action, wherein the first computer-controlled action comprises a search of one or more computer-implemented knowledge bases.

14. The system of claim 10, further comprising the one or more processor-based devices configured to:
perform the first computer-controlled action, wherein the first computer-controlled action comprises modifying a structure of the one or more processor-based devices.

15. The system of claim 14, further comprising the one or more processor-based devices configured to:
update the one or more probability distributions based upon the assessment of the result of the first computer-controlled action, wherein the result of first computer-controlled action comprises an inference from user behavioral information that is associated with the modified structure.

16. The system of claim 10, further comprising the one or more processor-based devices configured to:
perform the first computer-controlled action, wherein the first computer-controlled action comprises applying one or more sensors to attain information that is expected to result in the reduction of the uncertainty.

17. A system comprising one or more processor-based devices configured to:
determine a first computer-controlled action that is expected to result in a reduction of uncertainty that is embodied by one or more probabilities, wherein the first computer-controlled action comprises performing an analysis of a first text-based content;
perform the first computer-controlled action;
update the one or more probabilities based on an assessment of a result of the first computer-controlled action;
determine a second computer-controlled action in accordance with the updated one or more probabilities, wherein the second computer-controlled action comprises performing an analysis of a second text-based content; and
perform the second computer-controlled action.

18. The system of claim 17, further comprising the one or more processor-based devices configured to:
determine the first computer-controlled action that is expected to result in the reduction of uncertainty that is embodied by the one or more probabilities, wherein the first computer-controlled action comprises performing a search of text-based content and performing the analysis of the first text-based content, wherein the first text-based content is identified by the search.

19. The system of claim 17, further comprising the one or more processor-based devices configured to:
determine the first computer-controlled action that is expected to result in the reduction of uncertainty that is embodied by the one or more probabilities, wherein the first computer-controlled action comprises performing the analysis of the first text-based content, wherein the analysis of the first text-based content comprises a statistical analysis of words in the text-based content.

20. The system of claim 17, further comprising the one or more processor-based devices configured to:
determine the second computer-controlled action in accordance with the updated one or more probabilities and an expected value of information.

21. The system of claim 17, further comprising the one or more processor-based devices configured to:
generate text-based content in accordance with the updated one or more probabilities.

* * * * *